US008386996B2

(12) United States Patent
Prigge et al.

(10) Patent No.: US 8,386,996 B2
(45) Date of Patent: Feb. 26, 2013

(54) PROCESS EXTENSION WIZARD FOR COHERENT MULTI-DIMENSIONAL BUSINESS PROCESS MODELS

(75) Inventors: Uta Prigge, Heidelberg (DE); Stefan Kaetker, Dossenheim (DE)

(73) Assignee: SAP AG, Walldorf (DE)

( * ) Notice: Subject to any disclaimer, the term of this patent is extended or adjusted under 35 U.S.C. 154(b) by 1066 days.

(21) Appl. No.: 11/771,701

(22) Filed: Jun. 29, 2007

(65) Prior Publication Data
US 2009/0007056 A1 Jan. 1, 2009

(51) Int. Cl.
*G06F 9/44* (2006.01)
*G06Q 10/00* (2012.01)

(52) U.S. Cl. ........ 717/104; 717/105; 717/106; 717/107; 717/113; 705/7.12; 705/7.26; 705/7.27; 705/8; 705/9

(58) Field of Classification Search .................. 717/104; 705/7.12
See application file for complete search history.

(56) References Cited

U.S. PATENT DOCUMENTS

| 5,815,638 | A  * | 9/1998 | Lenz et al. .................. 706/15 |
| 6,088,678 | A  * | 7/2000 | Shannon ....................... 705/8 |
| 6,370,508 | B2 * | 4/2002 | Beck et al. ................ 705/7.26 |
| 6,988,014 | B2   | 1/2006 | Kraemer et al. |
| 7,065,493 | B1   | 6/2006 | Homsi |
| 7,373,310 | B1   | 5/2008 | Homsi |
| 7,503,033 | B2 * | 3/2009 | Meredith et al. ........... 717/104 |
| 2006/0015594 | A1 * | 1/2006 | Kontamsetty et al. ........ 709/221 |
| 2006/0085245 | A1 * | 4/2006 | Takatsuka et al. ............ 705/9 |
| 2006/0168555 | A1 * | 7/2006 | Represas Ferrao et al. .. 717/104 |
| 2007/0106520 | A1 * | 5/2007 | Akkiraju et al. .............. 705/1 |
| 2007/0179821 | A1 * | 8/2007 | Poetsch et al. ................ 705/7 |
| 2007/0283318 | A1 * | 12/2007 | Tong et al. ................. 717/104 |

OTHER PUBLICATIONS

Office Action issued in U.S. Appl. No. 11/771,871 on Oct. 6, 2010; 13 pages.
Office Action issued in U.S. Appl. No. 11/771,871 on Jun. 20, 2011; 12 pages.
Amendment in Reply to Office Action filed in U.S. Appl. No. 11/771,871 on Jan. 5, 2011; 10 pages.
Amendment in Reply to Office Action filed in U.S. Appl. No. 11/771,871 on Oct. 18, 2011; 11 pages.

* cited by examiner

*Primary Examiner* — Ted T Vo
(74) *Attorney, Agent, or Firm* — Fish & Richardson P.C.

(57) ABSTRACT

This disclosure relates to methods, systems, and software for processing a coherent multi-dimensional business process model. The software includes computer-readable instructions embodied on media to identify a coherent multi-dimensional business process model based on at least a portion of a first model for a business process and at least a portion of a second model for the business process. The software then parses the multi-dimensional business process model to identify at least one extension point, each extension point operable to interface a disparate business tool with the business process. The software is further operable to present an extension wizard to a client for a particular one of the identified extension points. It can create entities and extensions in various modeling environments and development environments.

30 Claims, 32 Drawing Sheets

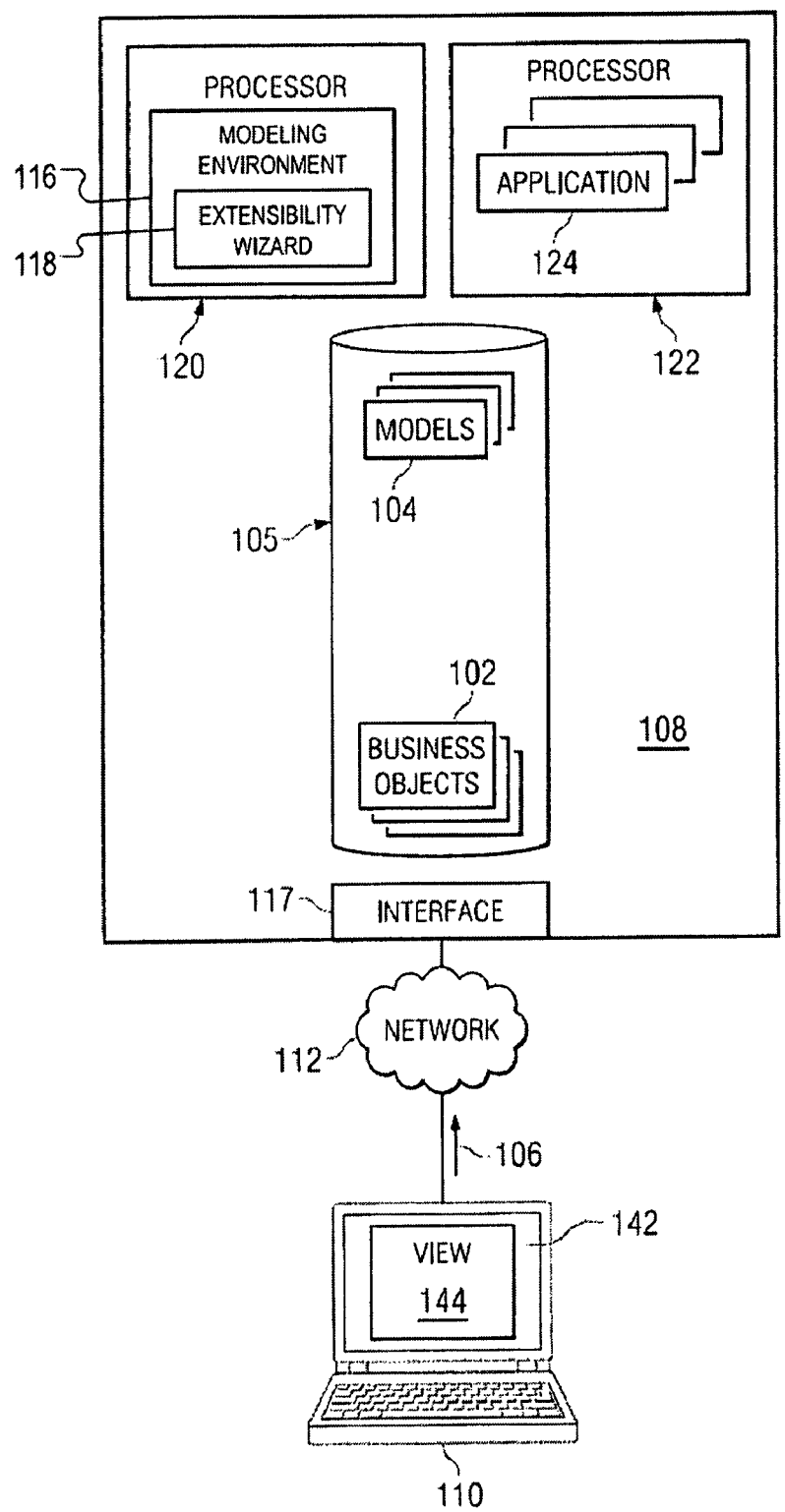

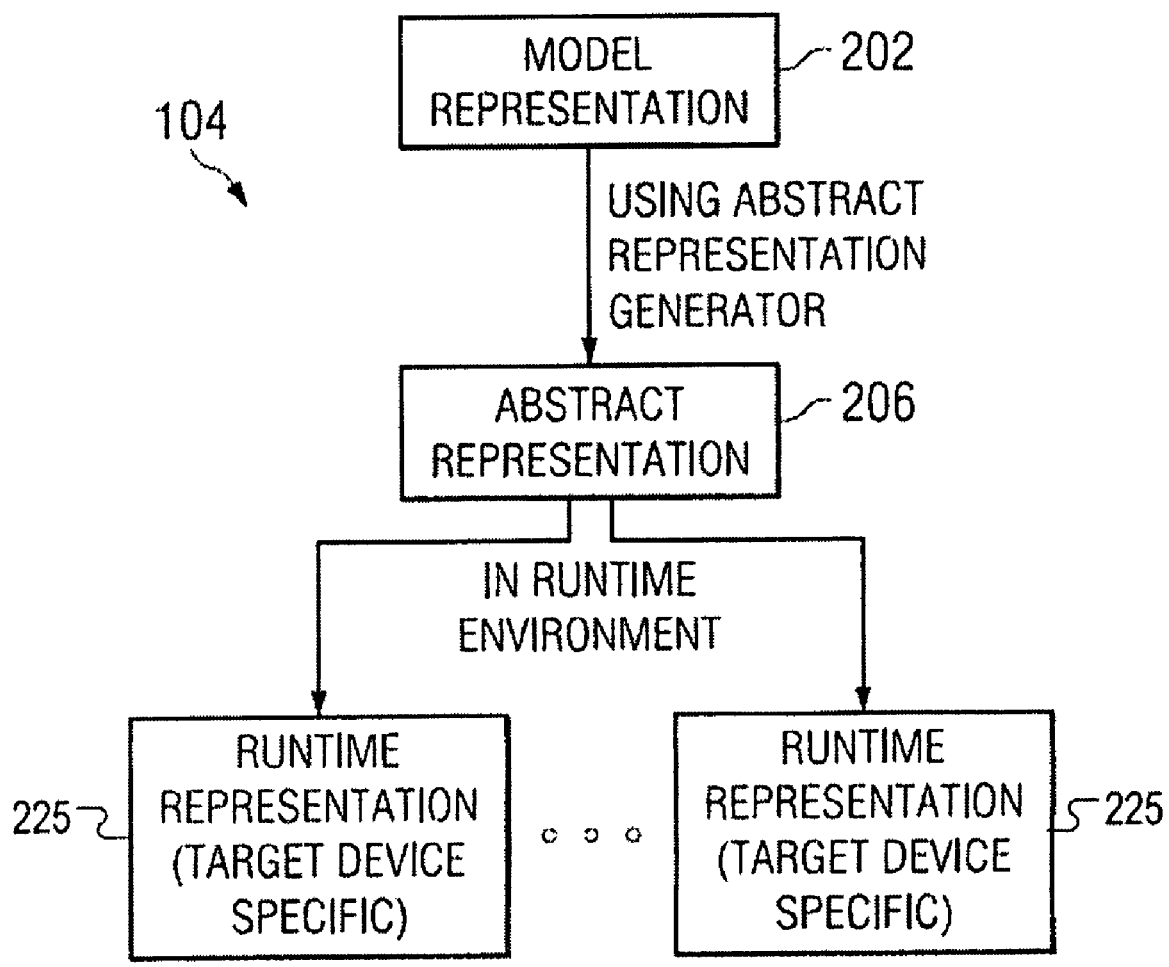

Enriched BPVT Model

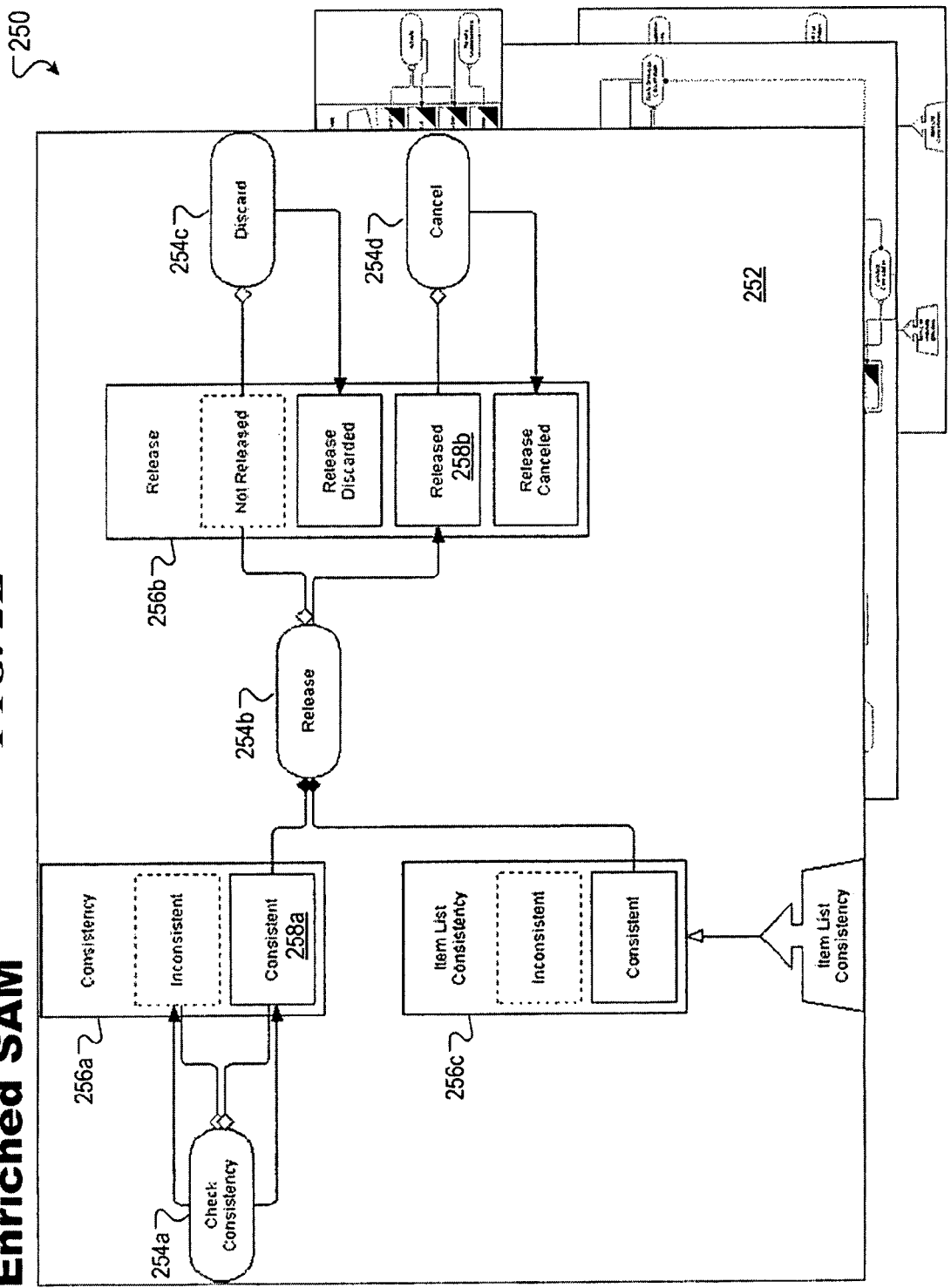

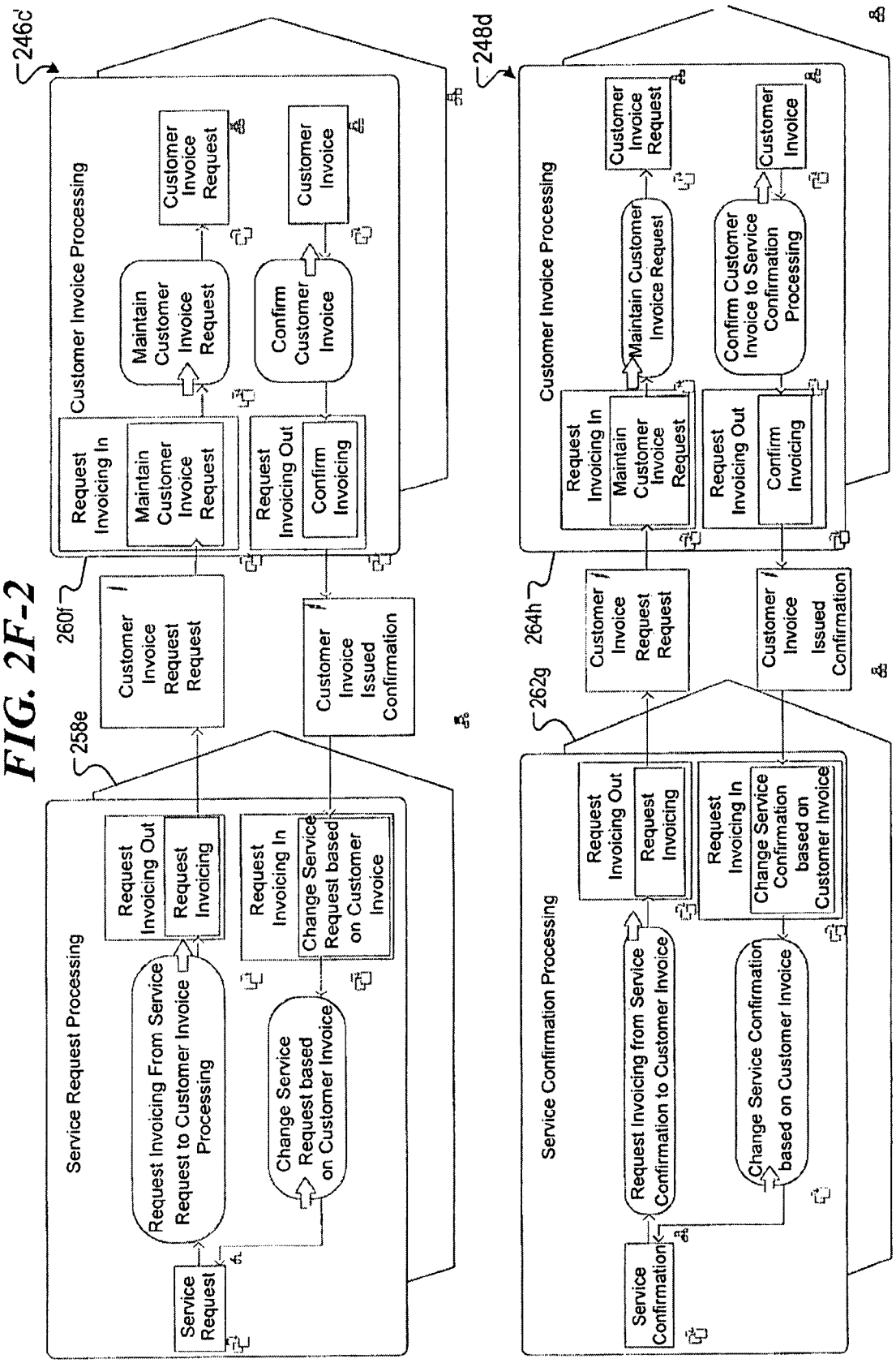

BO Flow Model

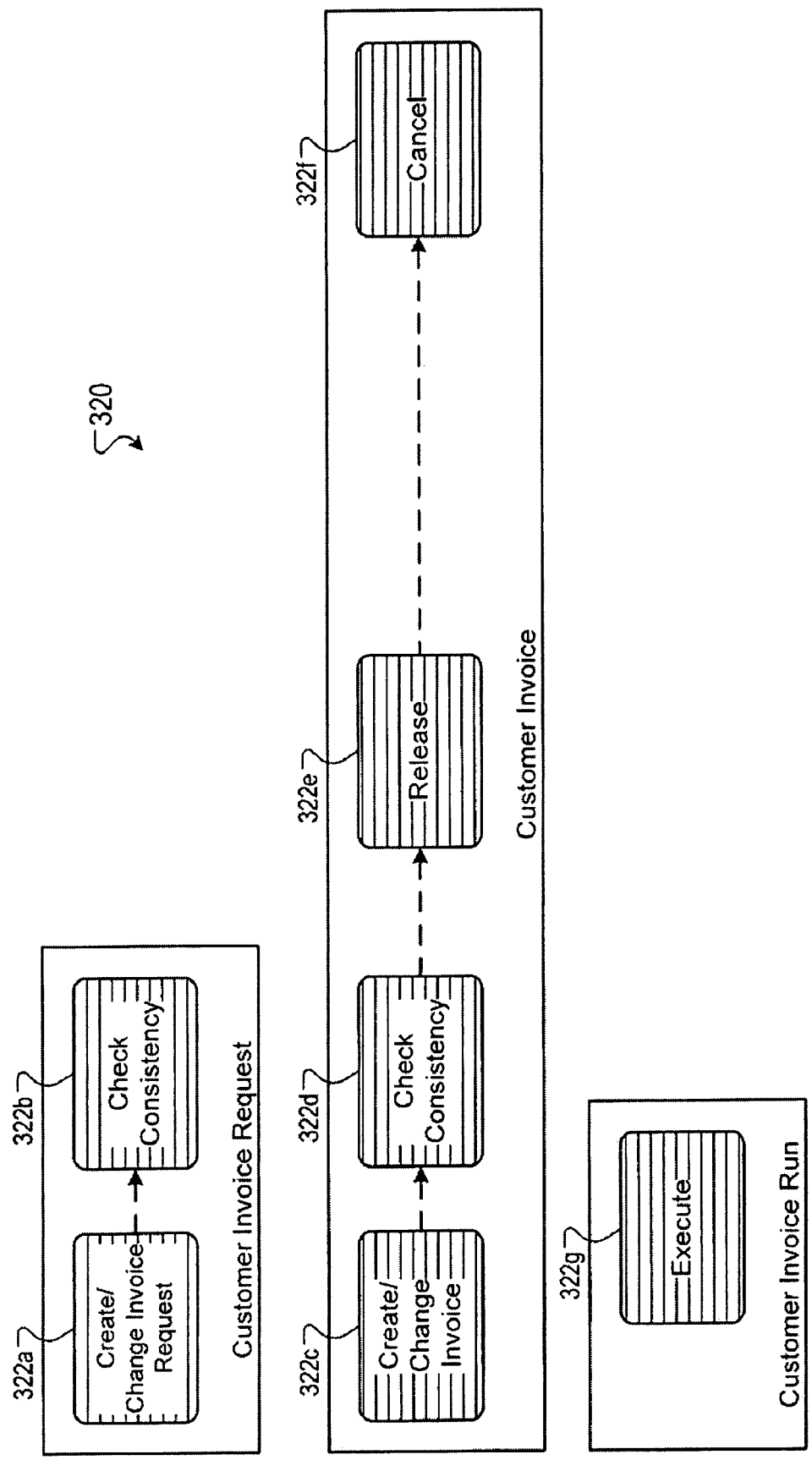

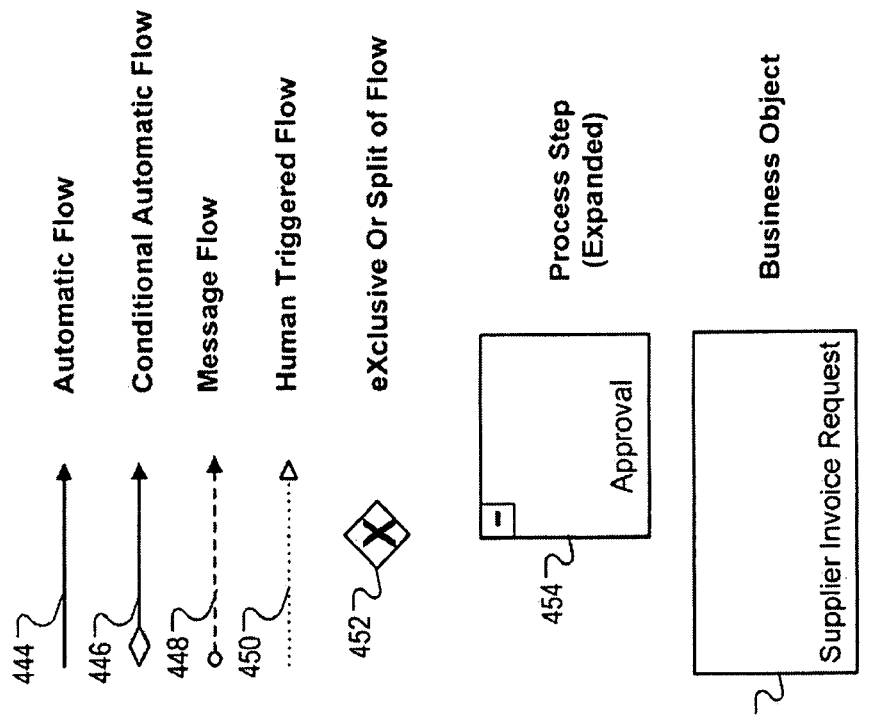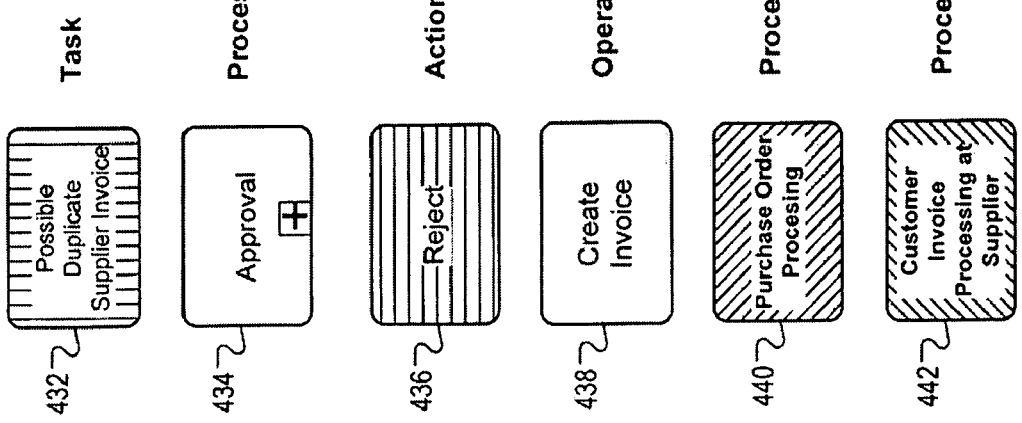
FIG. 4B Legend

Main User Interaction

PROCESS EXTENSION WIZARD FOR COHERENT MULTI-DIMENSIONAL BUSINESS PROCESS MODELS

TECHNICAL FIELD

This disclosure relates to computer systems and methods and, more particularly, to methods, systems, and software for generating, presenting, or otherwise managing coherent multi-dimensional business process models based on a plurality of disparate models.

BACKGROUND

Enterprise software systems are generally large and complex. Such systems can require many different components, distributed across many different hardware platforms, possibly in several different geographical locations. In order to design, configure, update or implement an enterprise software system, one is generally required to understand details of the system at varying levels, depending on his role in designing, managing or implementing the system. For example, a systems administrator may need a high-level technical understanding of how various software modules are installed on physical hardware, such as a server device or a network, and how those software modules interact with other software modules in the system. A person responsible for configuring the software may utilize a high-level functional understanding of the operations that each functional component provides. An application designer may utilize a low-level technical understanding of the various software interfaces that portions of the application require or implement. And an application developer may utilize a detailed understanding of the interfaces and functionality he is implementing in relation to the remainder of the system. But the flow of a business process within an application today is typically hidden from a user. In some cases, it is possible to manually create a textual or graphical documentation of this process flow. However, this documentation is typically not detailed enough and can become quickly outdated since its consistency with the actual application software is not (initially) verified or maintained automatically.

Within a development environment, an application can be developed using modeling systems. In general, these models can specify the types of development objects or components that can be used to build applications, as well as the relationships that can be used to connect those components. In an object-oriented architecture, for example, a defined application can include a combination of various data objects and resources (i.e., development objects). In that example, relationships among the development objects can include a relationship indicating that one data object inherits characteristics from another data object. Another example architecture is the model-view-controller (MVC) architecture. Applications built using the MVC architecture typically include three different types of components—models, which store data such as application data; views, which display information from one or more models; and controllers, which can relate views to models, for example, by receiving events (e.g., events raised by user interaction with one or more views) and invoking corresponding changes in one or more models. When changes occur in a model, the model can update its views. Data binding can be used for data transport between a view and its associated model or controller. For example, a table view (or a table including cells that are organized in rows and columns) can be bound to a corresponding table in a model or controller. Such a binding indicates that the table is to serve as the data source for the table view and, consequently, that the table view is to display data from the table. Continuing with this example, the table view can be replaced by another view, such as a graph view. If the graph view is bound to the same table, the graph view can display the data from the table without requiring any changes to the model or controller. In the MVC architecture, development objects can include models, views, controllers, and components that make up the models, views, and controllers. For example, application data in a model can be an example of a component that is a development object.

To graphically model an application such that a combination of abstract, graphical representations represent the components of the application and the relationships between those components, a developer typically uses a drawing tool, such as Microsoft Visio, that provides abstract representations and tools for manipulating and/or generating abstract representations. For example, a user of the drawing tool (such as a developer) can choose to use a circle (or any other suitable abstract representation or model) to represent a class (such as a class defined in the C++ or other object-oriented programming language) of an application developed under the object-oriented architecture. The circle that represents a development object can include data from the development object. For example, a name of a class (i.e., data from a development object) can be entered in a text box that is part of the circle, and that name can be displayed in the center of the circle. In addition to drawing tools, the developer can also use other graphical tools to generate graphical representations and models (e.g., Unified Modeling Language (UML) diagrams or Business Process Execution Languages (BPEL)) from application code or vice versa.

SUMMARY

This disclosure relates to methods, systems, and software for processing a coherent multi-dimensional business process model. In a first aspect, software for processing a coherent multi-dimensional business process model includes computer-readable instructions embodied on media and operable when executed to identity a first model and a second model for a business process. The computer-readable instructions are further operable when executed to transform at least a portion of the first model and at least a portion of the second model into a coherent multi-dimensional business process model. The computer-readable instructions are further operable when executed to present at least a subset of the coherent multi-dimensional business process model to a client.

Implementations can include any, all, or none of the following features. For example, the first model can include a business process variant flow model and the second model can include a state action model. In another example, the software may be further operable to perform various functionality such as, for example, enriching the business process variant flow model with inbound interactions and relevant business objects and enriching the state action model with flagged actions and configuration links. The software may also scan the business process variant flow model for one or more associated business objects. The software can be further operable to scan the business process variant flow model for one or more associated status schemes and to transform the state action model into an allowed model for each identified business object and ordered by the status scheme. The software may also transform at least a portion of one or more business object flow models into the coherent multi-dimensional business process model. In yet another example, the software can regenerate the coherent multi-dimensional business process model in response to the first model being changed.

In another aspect, the software includes computer-readable instructions embodied on media and operable to identify a coherent multi-dimensional business process model based on at least a portion of a first model for a business process and at least a portion of a second model for the business process. This multi-dimensional business process model may previously exist or be a model generated using one of the transformation techniques disclosed herein. The software then parses the multi-dimensional business process model to identify at least one extension point, each extension point operable to interface a disparate business tool with the business process. The software is further operable to present an extension wizard to a client for a particular one of the identified extension points.

In some cases, this identified multi-dimensional business process model can be protected from modification by the client. The extension wizard can present one or more extensibility patterns compatible with the particular extension point. The extensibility patterns can be selected from the following: add a business task; add field; add after process; add before process; and add in between process. The extensibility wizard can be operable to present a series of questions to the client based on the first model. The software can be further operable to add one or more modeling elements at the particular extension point in response to client input.

The foregoing example software—as well as other disclosed processes—may also be computer implementable methods. Moreover, some or all of these aspects may be further included in respective systems or other devices for executing, implementing, or otherwise supporting processing a coherent multi-dimensional business process model. The details of these and other aspects and embodiments of the disclosure are set forth in the accompanying drawings and the description below. Other features, objects, and advantages of the various embodiments will be apparent from the description and drawings, as well as from the claims.

DESCRIPTION OF DRAWINGS

FIG. 2B depicts a simplified process for mapping a model representation to a runtime representation using the example modeling environment of FIG. 2A or some other modeling environment;

FIGS. 2D-2G illustrate example models used in generating the multi-dimensional business process model;

FIGS. 3A-3E illustrate example techniques for transforming the models of FIGS. 2D-2G into the multi-dimensional business process model;

FIGS. 4A-B illustrate an example multi-dimensional business process model and one legend for various components of the multi-dimensional business process model;

DETAILED DESCRIPTION

Figure 2A:
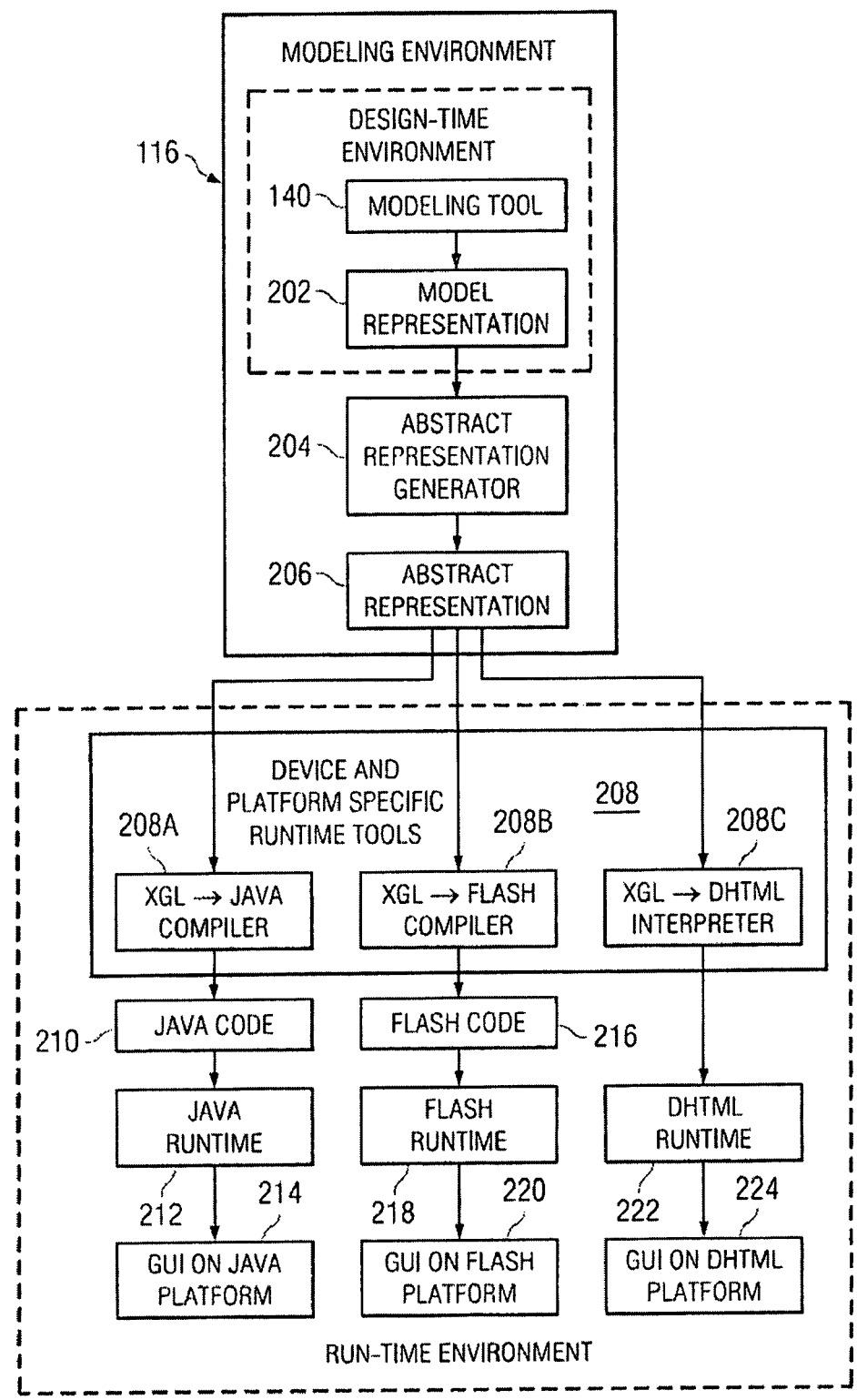
FIG. 2A depicts an example modeling environment in accordance with one embodiment of FIG. 1.

This disclosure generally describes an example environment 100 for processing a coherent multi-dimensional business process model. At a high level, the model is a representation of a software system, part of a software system, or an aspect of a software system. The model can be associated with one or more views. A view of the model represents a subset of the information in the model. For purposes of discussion, the term "model" will be used to refer to both the model and a view of the model. The model can be used in a software development process to describe or specify a software application, or parts or aspects of a software application, for developers implementing or modifying the application. The model specifies the design to a useful level of detail or granularity. In this way, a compliant implementation or deployment of the modeled functionality can conform to the specification represented by the model. For example, the model may represent a sequence of steps, executed to achieve a business result. According to the particular design, each step can result in the change of state of a business object. Business processes can be part of, triggered by, and superior to other business processes. Business processes can be modeled in a hierarchy. As described herein, the business process hierarchy includes a requirements definition, design specification, and implementation description level, but other ways of defining a business process or other view hierarchy are possible. Thus, the models described herein can be written in description notations appropriate for process modeling. As described in more detail below, the model may include any number of logical layers, each of which include one or more domains and represent a logical category of modeling such as high level business views, system independent process views, and implementation views. Each layer may be considered a sub-model or a model in its own right that can be bound with other layers/models. Moreover, each logical layer can—in some cases—be bound with a plurality of lower layers, such as one system independent process view being bound to a number of disparate, but similar, implementation views. Often, the domains in one layer substantially match the domains in other bound layers.

In this disclosure, techniques are provided to automatically generate a business process flow representation out of underlying more technical models used in the design and runtime of the application software. The actual flow of a business process within the application is spread over different areas like system integration, internal status and action management of a business object as well as user tasks and workflows. These techniques take this different information sources to generate a detailed view of the complete process flow that can be both well readable for a user and still has a tight link to the actual technical implementation of the software. Creating such a reliable representation of the process flow within an application greatly reduces the efforts for companies to adapt the software to their needs by reducing the learning efforts. Further, this generated process flow model can be the basis for easy extensions and adaptations.

Figure 2C:
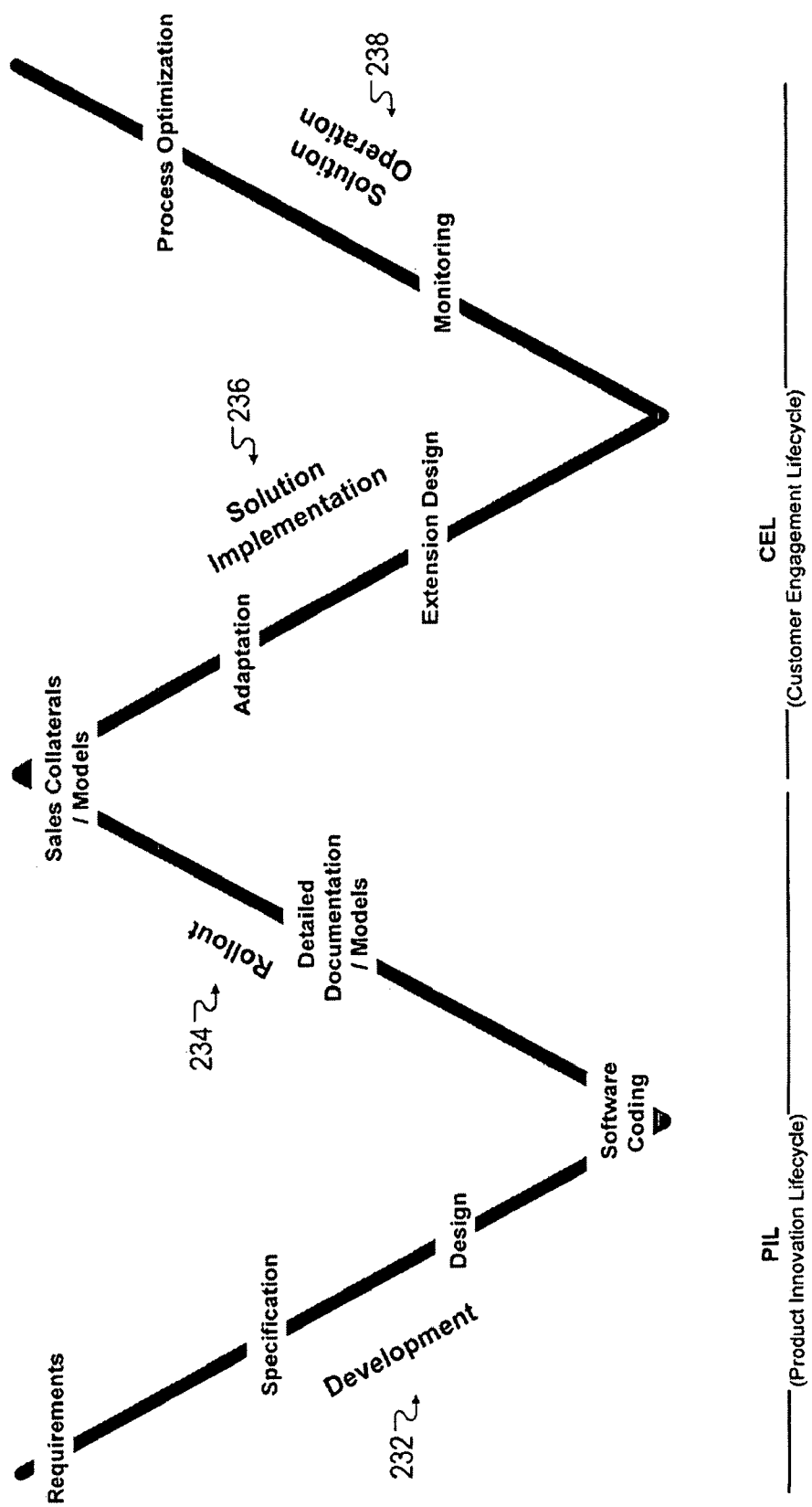
FIG. 2C illustrates example modeling phases using the example modeling environment of FIG. 2A or some other modeling environment.
Figure 2D:
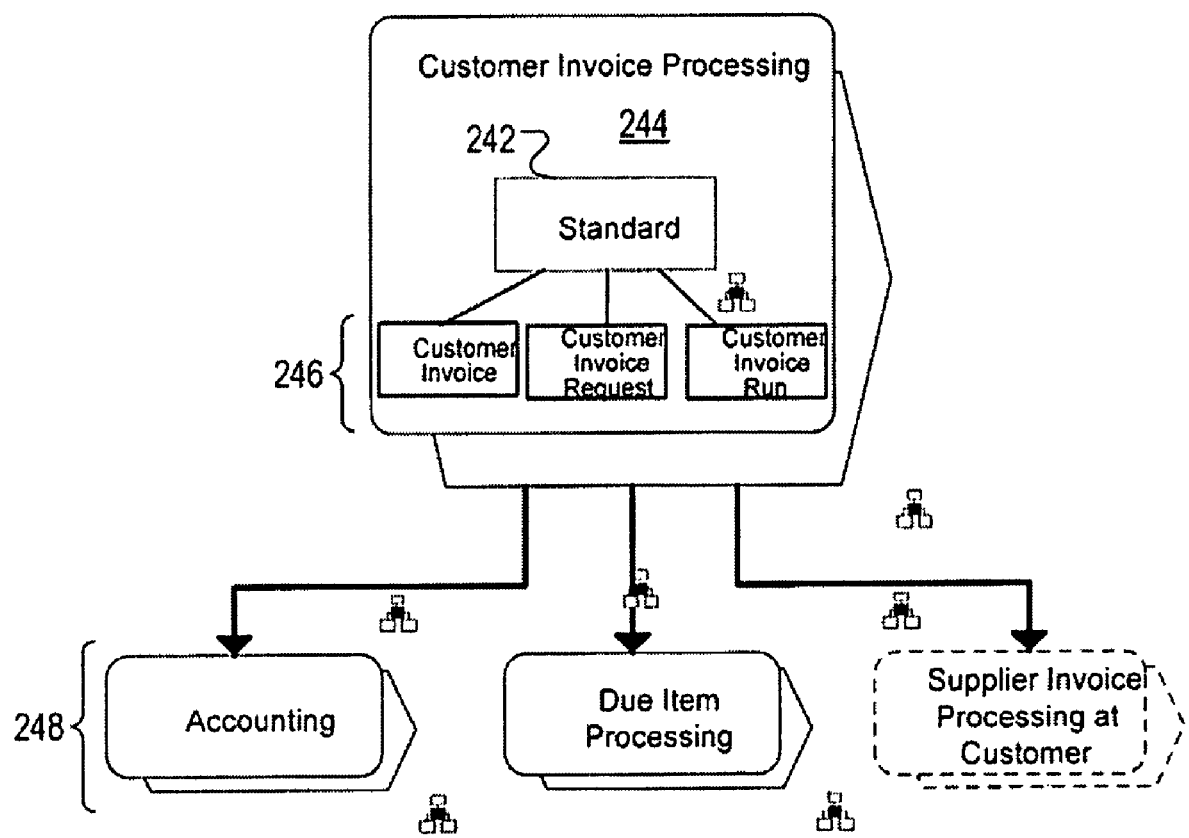
Figures 1, 2F:
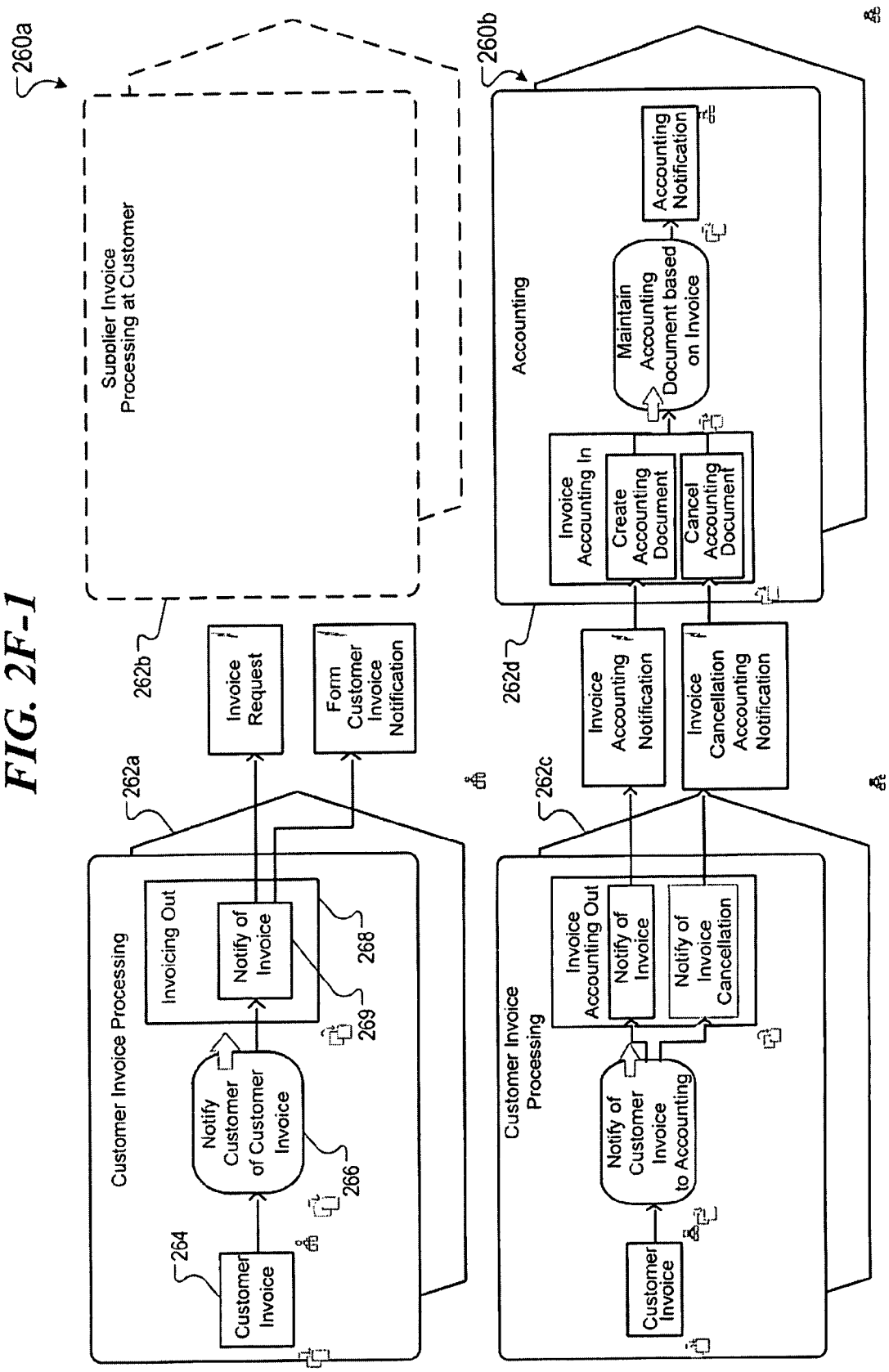

With respect to example FIG. 1, environment 100 is typically a distributed client/server system that spans one or more networks such as 112. As described above, rather than being delivered as packaged software, portions of environment 100 may represent a hosted solution, often for an enterprise or other small business, that may scale cost-effectively and help drive faster adoption. In this case, portions of the hosted solution may be developed by a first entity, while other components are developed by a second entity. Moreover, the processes or activities of the hosted solution may be distributed amongst these entities and their respective components. In some embodiments, environment 100 may be in a dedicated enterprise environment—across a local area network or subnet—or any other suitable environment without departing from the scope of this disclosure.

Turning to the illustrated embodiment, environment 100 includes or is communicably coupled with server 108 and one or more clients 110, at least some of which communicate across network 112. Server 108 comprises an electronic computing device operable to receive, transmit, process and store data associated with environment 100. For example, server 108 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). But, more generally, FIG. 1 provides merely one example of computers that may be used with the disclosure. Each computer is generally intended to encompass any suitable processing device. For example, although FIG. 1 illustrates one server 108 that may be used with the disclosure, environment 100 can be implemented using computers other than servers, as well as a server pool. Indeed, server 108 may be any computer or processing device such as, for example, a blade server, general-purpose personal computer (PC), Macintosh, workstation, Unix-based computer, or any other suitable device. In other words, the present disclosure contemplates computers other than general purpose computers, as well as computers without conventional operating systems. Server 108 may be adapted to execute any operating system including Linux, UNIX, Windows Server, or any other suitable operating system. According to one embodiment, server 108 may also include or be communicably coupled with a web server and/or a mail server.

Server 108 often includes local memory 105. Memory 105 may include any memory or database module and may take the form of volatile or non-volatile memory including, without limitation, magnetic media, optical media, random access memory (RAM), read-only memory (ROM), removable media, or any other suitable local or remote memory component. Illustrated memory 105 includes one or more data objects 102 and, at some point, one or more modeled elements 104. But memory 105 may also include any other appropriate data such as HTML files or templates, data classes or object interfaces, software applications or sub-systems, and others (whether illustrated or not). For example, memory 105 may include pointers or other references to data objects 102 that were published to a location remote from server 108. In this way, a local developer or non-technical business analyst may use a remote model 104 or modeling domain to efficiently supplement the particular aspect that he is modeling or viewing.

Data objects 102 are elements for information storage in object-oriented computing systems. Data objects can describe the characteristics of an item using a series of data fields that, for example, can correspond to described characteristics. Typically, a programmer will predefine standard object classes, referred to in the present specification as object types, that are hardcoded into a set of machine-readable instructions for performing operations. Object types are blueprints for describing individual objects using a defined set of class attributes (or properties). Instantiated objects that are members of such standard object types can be applied in a variety of different data processing activities by users, for example, customers who are largely unaware of the structure of the standard object types. Put another way, the data objects 102 are generally logical structures that can be modeled and then instantiated upon deployment to store particular data. Business objects may be a particular form of data object that a developer can utilize or reference in the front-end of any business or other modeled application.

According to some embodiments, the developer (or other analyst) may use a model-driven development environment 116 to compose an application using models 104 of business logic or processes, data objects 102, user interfaces, and so forth without having to write much, if any, code. Moreover, these models can include or be different logical layers of abstraction including system-specific, system-independent, business-independent instances. Indeed, one of these logical layers may represent actual code or modules, whether source or executable, to assist developers. These layers of abstractions can include different domains that provide different views on the particular abstraction, including graphical interfaces, business processes or logic, and data flow. In some circumstances, some or all of these models 104 may conform to a particular metamodel or metadata infrastructure. To aid the developer, analyst, or other user working with the model 104, portions may be extracted from the (perhaps very large) model 104. A view of this extracted portion can then be presented to the requesting or another user, often via interface 142. The extracted portion of model 104 can be intersected or aggregated with extracted portions to generate a unified view on the subset. For example, the user may utilize a filter provided by modeling environment 116 to drill down to a more manageable subset. This example user may then provide customized criteria to focus on particular portions of this subset.

Modeling environment 116 includes extensibility wizard 118. Extensibility wizard 118 identifies points at which the presented portion of the coherent multi-dimensional business process model may be extended with additional elements. These multi-dimensional business process model may previously exist or be models generated using one of the transformation techniques disclosed herein (or one similar). For example, one or more elements of the business process represented by the portion may be interfaced with a business tool or application that is disparate from the business process using additional elements.

Some or all of the data objects 102 and models 104 may be stored or referenced in a local or remote development or metamodel repository. This repository may include parameters, pointers, variables, algorithms, instructions, rules, files, links, or other data for easily providing information associated with or to facilitate modeling of the particular object. More specifically, each repository may be formatted, stored, or defined as various data structures in eXtensible Markup Language (XML) documents, text files, Virtual Storage Access Method (VSAM) files, flat files, Btrieve files, comma-separated-value (CSV) files, internal variables, one or more libraries, or any other format capable of storing or presenting all or a portion of the interface, process, data, and other models or modeling domains. In short, each repository may comprise one table or file or a plurality of tables or files stored on one computer or across a plurality of computers in any appropriate format as described above. Indeed, some or all of the particular repository may be local or remote without departing from the scope of this disclosure and store any type of appropriate data.

In addition to memory, illustrated server 108 includes example processors 120 and 122. The processors 120 and 122 may each be a central processing unit (CPU), a blade, an application specific integrated circuit (ASIC), or a field-programmable gate array (FPGA). Both processors (120 and 122) may execute instructions and manipulate data to perform the operations of server 108. Although FIG. 1 illustrates two processors (120 and 122) in server 108, only one or more than two processors may be used according to particular needs, desires, or particular embodiments of environment 100. In the illustrated embodiment, processor 120 executes model-driven development tool (or environment) 116, and processor 122 executes modeled business application 124. At a high level, the modeling environment 116 and application 124 are operable to receive and/or process requests from developers and/or users and present at least a subset of the results to the particular user via an interface.

The GUI modeling environment 116 may be any development tool, toolkit, application programming interface (API), application, or other framework that allows a developer to develop, configure, and utilize various business elements that can be more easily modeled during modeling (or during design time) of a particular business application. For example, the model-driven framework or environment may allow the developer to use simple drag-and-drop techniques to develop pattern-based or freestyle user interfaces and define the flow of data between them. Such drag and drop techniques may include selecting, inputting, identifying, or some other indication that the developer is interested in a particular object or element. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding; in other words, the modeling environment can be used to create, modify, and examine the model.

In some cases, this example modeling environment 116 may provide a personalized, secure interface that helps unify enterprise applications, information, and processes into a coherent, role-based portal experience. Further, the modeling environment may allow the developer to access and share information and applications in a collaborative environment. In this way, virtual collaboration rooms allow developers to work together efficiently, regardless of where they are located, and may enable powerful and immediate communication that crosses organizational boundaries, while enforcing security requirements. Indeed, the modeling environment may provide a shared set of services for finding, organizing, and accessing unstructured content stored in third-party repositories, and content management systems across various networks 112. Classification tools may automate the organization of information, while subject-matter experts and content managers can publish information to distinct user audiences. Regardless of the particular implementation or architecture, this modeling environment may allow the developer to easily model various elements using this model-driven approach. As described in more example detail later, the model is deployed, and environment 100 may translate the model into the required code for at least one application 124 or web service. This deployed business application 124 may then be modified or enhanced, as appropriate, using the modeling environment 116.

More specifically application 124 may represent any modeled software or other portion of business functionality or logic. A first instance of application 124 may represent a first application that is .NET-based, while a second instance of application 124 may be a similar hosted web-based solution. In yet another example, application 124 may be a modeled composite application with any number of portions that may be implemented as Enterprise Java Beans (EJBs), or the design-time components may have the ability to generate run-time embodiments into different platforms such as J2EE, ABAP (Advanced Business Application Programming) objects, or Microsoft's .NET. In a further example, application 124 may merely be a modeled and published web service. Further, while illustrated as internal to server 108, one or more processes associated with modeling environment 116 or application 124 may be stored, referenced, or executed remotely. For example, a portion of an application may be a web service that is remotely called, while another portion of the application, may be an interface object bundled for processing at remote client 110. Moreover, modeling environment 116 or application 124 may each be a child or sub-module of other respective software modules or enterprise applications (not illustrated) without departing from the scope of this disclosure.

Regardless of the particular implementation, "software" may include software, firmware, wired or programmed hardware, or any combination thereof as appropriate. Indeed, each software component may be fully or partially written or described in any appropriate computer language including C, C++, Java, Visual Basic, assembler, Perl, any suitable version of 4GL, as well as others. It will be understood that while the software illustrated in FIG. 1 is shown as a single module that implements the various features and functionality through various objects, methods, or other processes, the software may instead include a number of sub-modules, third party services, components, libraries, and such, as appropriate. Conversely, the features and functionality of various components can be combined into single components as appropriate.

Server 108 may also include interface 117 for communicating with other computer systems, such as clients 110, over network 112 in a client-server or other distributed environment. In certain embodiments, server 108 receives data from internal or external senders through interface 117 for storage in memory 105 and/or processing by processor 120 or processor 122. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals. Interface 117 may allow communications across network 112 via a virtual private network (VPN), SSH (Secure Shell) tunnel, or other secure network connection.

Network 112 facilitates wireless or wireline communication between computer server 108 and any other local or remote computer, such as clients 110. Network 112 may be all or a portion of an enterprise or secured network. In another example, network 112 may be a VPN merely between server 108 and client 110 across wireline or wireless link. Such an example wireless link may be via 802.11a, 802.11b, 802.11g, 802.20, WiMax, and many others. While illustrated as a single or continuous network, network 112 may be logically divided into various sub-nets or virtual networks without departing from the scope of this disclosure, so long as at least a portion of network 112 may facilitate communications between server 108 and at least one client 110. In other words, network 112 encompasses any internal or external network, networks, sub-network, or combination thereof operable to facilitate communications between various computing components in environment 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 112 may be a secure network associated with the enterprise and certain local or remote clients 110.

Client 110 is any computing device operable to connect or communicate with server 108 or network 112 using any communication link. At a high level, each client 110 includes or executes at least GUI 142 and comprises an electronic computing device operable to receive, transmit, process and store any appropriate data associated with environment 100. It will be understood that there may be any number of clients 110 communicably coupled to server 108. Further, "client 110," "developer," and "user" may be used interchangeably as appropriate without departing from the scope of this disclosure. Moreover, for ease of illustration, each client 110 is described in terms of being used by one user. But this disclosure contemplates that many users may use one computer or that one user may use multiple computers. As used in this disclosure, client 110 is intended to encompass a personal computer, touch screen terminal, workstation, network computer, kiosk, wireless data port, smart phone, personal data assistant (PDA), one or more processors within these or other devices, or any other suitable processing device. For example, client 110 may be a PDA operable to wirelessly connect with external or unsecured network. In another example, client 110 may comprise a laptop that includes an input device, such as a keypad, touch screen, mouse, or other device that can accept information, and an output device that conveys information associated with the operation of server 108 or clients 110, including digital data, visual information, or GUI 142. Both the input device and output device may include fixed or removable storage media such as a magnetic computer disk, CD-ROM, or other suitable media to both receive input from and provide output to users of clients 110 through the display, namely, the client portion of GUI or application interface 142.

GUI 142 comprises a graphical user interface operable to allow the user of client 110 to interface with at least a portion of environment 100 for any suitable purpose, such as viewing application, model, or model subset (view) data 144. As the models 104 are filtered, at least a viewable portion of the results 144 are presented using GUI 142. Generally, GUI 142 provides the particular user with an efficient and user-friendly presentation of data provided by or communicated within environment 100. More specifically, GUI 142 can include a modeling editor that presents views of models 104 based upon filters. The modeling editor can be connected with the modeling environment 116 (or other development environment) such that the modeling editor and/or the modeling environment 116 can automatically generate an application model (e.g., a model of an application that is being developed) from a graphical model and/or vice versa. The modeling editor can allow a user to freely choose graphical objects that can represent one or more development objects, or no development objects at all. The modeling editor can support representing different abstraction levels that correspond to a graphical model. For example, this modeling editor can support modeling a detailed view or an abstract view of a graphical model. Typically, the information that is represented in a graphical model can be freely edited. For example, a graphical model can be edited to include user-descriptions or business information that is not part of the development objects and/or relationships among development objects. Changes to development objects and/or relationships among development objects can be automatically reflected in an associated graphical model, and/or vice versa. Accordingly, GUI 142 may comprise a plurality of customizable frames or views having interactive fields, pull-down lists, and buttons operated by the user. GUI 142 may also present a plurality of portals or dashboards. For example, GUI 142 may display a portal that allows developers or information managers to view, create, and manage data objects 102 or models. GUI 142 is often configurable, supporting a combination of tables and graphs (bar, line, pie, status dials, etc.) and is able to build real-time dashboards. It should be understood that the term "graphical user interface" may be used in the singular or in the plural to describe one or more graphical user interfaces and each of the displays of a particular graphical user interlace. Indeed, reference to GUI 142 may indicate a reference to the front-end or a component of any application or software, as well as the particular interface accessible via client 110, as appropriate, without departing from the scope of this disclosure. Therefore, GUI 142 contemplates any graphical user interface, such as a generic web browser or touchscreen, that processes information in environment 100 and efficiently presents the results to the user. Server 108 can accept data from client 110 via the web browser (e.g., Microsoft Internet Explorer or Mozilla Firefox) and return the appropriate HTML or XML responses to the browser using network 112.

FIG. 2A depicts a more detailed example modeling environment 116, in accordance with one embodiment of the present disclosure. Such a modeling environment 116 may implement techniques for decoupling models created during design-time from the runtime environment. In other words, model representations for GUIs created in a design-time environment are decoupled from the runtime environment in which the GUIs are executed. Often, in these environments, a declarative and executable representation for GUIs for applications is provided that is independent of any particular runtime platform, GUI framework, device, or programming language.

In certain embodiments, the modeling environment 116 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and, therefore, can unambiguously encapsulate execution semantics for the GUI described by a model representation. In short, models of different types can be transformed to XGL representations.

The XGL representation may be used for generating representations of various different GUIs and supporting various GUI features, including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 2A, modeling tool 140 may be used by a GUI designer or business analyst during the application design phase to create a model representation 202 for a GUI application. It will be understood that modeling environment 116 may include or be compatible with various different modeling tools 140 used to generate model representation 202. This model representation 202 may be a machine-readable representation of an application or a domain specific model. Model representation 202 generally encapsulates various design parameters related to the GUI such as GUI components, dependencies between the GUI components, inputs and outputs, and the like. Put another way, model representation 202 provides a form in which the one or more models can be persisted and transported, and possibly handled by various tools such as code generators, runtime interpreters, analysis and validation tools, merge tools, and the like. In one embodiment, model representation 202 maybe a collection of XML documents with a well-formed syntax.

Illustrated modeling environment 116 also includes an abstract representation generator (or XGL generator) 204 operable to generate an abstract representation (for example, XGL representation or XGL-compliant representation) 206 based upon model representation 202. Abstract representation generator 204 takes model representation 202 as input and outputs abstract representation 206 for the model representation. Model representation 202 may include multiple instances of various forms or types, depending on the tool/language used for the modeling. In certain cases, these various different model representations may each be mapped to one or more abstract representations 206. Different types of model representations may be transformed or mapped to XGL representations. For each type of model representation, mapping rules may be provided for mapping the model representation to the XGL representation 206. Different mapping rules may be provided for mapping a model representation to an XGL representation.

This XGL representation 206 that is created from a model representation may then be used for processing in the runtime environment. For example, the XGL representation 206 may be used to generate a machine-executable runtime GUI (or some other runtime representation) that may be executed by a target device. As part of the runtime processing, the XGL representation 206 may be transformed into one or more runtime representations, which may indicate source code in a particular programming language, machine-executable code for a specific runtime environment, executable GUI, and so forth, that may be generated for specific runtime environments and devices. Since the XGL representation 206, rather than the design-time model representation, is used by the runtime environment, the design-time model representation is decoupled from the runtime environment. The XGL representation 206 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 206 generated for a model representation 202 is generally declarative and executable in that it provides a representation of the GUI of model 202 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 206 is also not GUI runtime platform-specific. The abstract representation 206 provides a self-contained, closed, and deterministic definition of all aspects of a graphical user interface that is device independent and language independent.

Abstract representation 206 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), and the GUIs generated by the devices are consistent with each other in their appearance and behavior.

Abstract generator 204 may be configured to generate abstract representation 206 for models of different types, which may be created using different modeling tools 140. It will be understood that modeling environment 116 may include some, none, or other sub-modules or components as those shown in this example illustration. In other words, modeling environment 116 encompasses the design-time environment (with or without the abstract generator or the various representations), a modeling toolkit (such as 140) linked with a developer's space, or any other appropriate software operable to decouple models created during design-time from the runtime environment. Abstract representation 206 provides an interface between the design-time environment and the runtime environment. As shown, this abstract representation 206 may then be used by runtime processing.

As part of runtime processing, modeling environment 116 may include various runtime tools 208 and may generate different types of runtime representations based upon the abstract representation 206. Examples of runtime representations include device or language-dependent (or specific) source code, runtime platform-specific machine-readable code, GUIs for a particular target device, and the like. The runtime tools 208 may include compilers, interpreters, source code generators, and other such tools that are configured to generate runtime platform-specific or target device-specific runtime representations of abstract representation 206. The runtime tool 208 may generate the runtime representation from abstract representation 206 using specific rules that map abstract representation 206 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 206 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 2A, an XGL-to-Java compiler 208a may take abstract representation 206 as input and generate Java code 210 for execution by a target device comprising a Java runtime 212. Java runtime 212 may execute Java code 210 to generate or display a GUI 214 on a Java-platform target device. As another example, an XGL-to-Flash compiler 208b may take abstract representation 206 as input and generate Flash code 216 for execution by a target device comprising a Flash runtime 218. Flash runtime 218 may execute Flash code 216 to generate or display a GUI 220 on a target device comprising a Flash platform. As another example, an XGL-to-DHTML (dynamic HTML) interpreter 208c may take abstract representation 206 as input and generate DHTML statements (instructions) on the fly which are then interpreted by a DHTML runtime 222 to generate or display a GUI 224 on a target device comprising DHTML platform.

It should be apparent that abstract representation 206 may be used to generate GUIs for Extensible Application Markup Language (XAML) or various other runtime platforms and devices. The same model representation 206 may be mapped to various runtime representations and device-specific and runtime platform-specific GUIs. In general, in the runtime environment, machine executable instructions specific to a runtime environment may be generated based upon the abstract representation 206 and executed to generate a GUI in the runtime environment. The same XGL representation may be used to generate machine executable instructions specific to different runtime environments and target devices.

According to certain embodiments, the process of mapping a model representation 202 to an abstract representation 206 and mapping an abstract representation 206 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 206 rather than model representation 202 for runtime processing, the model representation 202 that is created during design-time is decoupled from the runtime environment. Abstract representation 206 thus provides an interface between the modeling environment and the runtime environment. As a result, changes may be made to the design time environment, including changes to model representation 202 or changes that affect model representation 202, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies, such as the target device platform or programming language dependencies.

FIG. 2B depicts an example process for mapping a model representation 202 to a runtime representation using the example modeling environment 116 of FIG. 2A or some other modeling environment. Model representation 202 may comprise one or more model components 104 and associated properties that describe a modeling domain, such as interfaces, processes, and data. The abstract representation 206 is generated based upon model representation 202. Abstract representation 206 may be generated by the abstract representation generator 204. Abstract representation 206 comprises one or more abstract GUI components and properties associated with the abstract GUI components. As part of generation of abstract representation 206, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 225, including GUIs for specific runtime environment platforms, may be generated from abstract representation 206. A device-dependent runtime representation may be generated for a particular type of target device platform to be used for executing and displaying the GUI encapsulated by the abstract representation. The GUIs generated from abstract representation 206 may comprise various types of GUI elements such as buttons, windows, scrollbars, inputs boxes, etc. Rules may be provided for mapping an abstract representation to a particular runtime representation. Various mapping rules may be provided for different runtime environment platforms.

As described with respect to FIG. 2A, modeling tool 140 may be used by a GUI designer or business analyst during the application design phase to create a model representation 202 for a GUI application. In addition, modeling tool 140 may be used during other modeling phases and by other types of users to create model representations 202 for a GUI application. FIG. 2C illustrates example modeling phases 230 using the example modeling environment 116 of FIG. 2A or some other modeling environment. Modeling phases 230 may include development 232, rollout 234, solution implementation 236, and solution operation 238. In some implementations, development 232 and rollout 234 represent a product innovation lifecycle, while solution implementation 236 and solution operation 238 represent a customer engagement lifecycle. Development 232 may include, for example, determining requirements of a product or application, writing a specification for the product or application, designing the product or application, and writing software code for the product or application. Rollout 234 may continue with software coding, and also includes generating detailed documentation and/or detailed models, as well as sales collaterals and/or sales models. Solution implementation 236 may continue with generation of sales collaterals and/or models, and also includes adapting the product or application, as well as extending the design of the product or application. Solution operation 238 may include, for example, monitoring the product or application and optimizing processes in the product or application. Generation of a multi-dimensional business process model provides access to modeling phases 230 for review and/or changes by a user.

FIGS. 2D-2G illustrate example models used in generating the multi-dimensional business process model. Particularly, FIG. 2D illustrates enriched business process variant type (BPVT) model 240. BPVT models may be created, for example, as a result of modeling business processes in application platforms using the Architecture of Integrated Information Systems (ARIS) method. A BPVT is a particular variation of a business process. For example, BPVT model 240 includes standard variation 242 of customer invoice processing process component 244. That is, a company may use process component 244 to process a customer invoice. Other process components may perform other business processes, and other variations of process component 244 may exist. BPVT model 240 may be included in one or more of models 104.

Modeling tool 140 enriches, or extends, BPVT model 240 with additional information associated with process component 244. Modeling tool 140 adds business objects 246 from process component 244 to BPVT model 240 that are relevant for variation 242. Particularly, modeling tool 140 adds customer invoice, customer invoice request, and customer invoice run business objects to process component 244. In some implementations, the ARIS method is enhanced to allow BPVT model 240 to connect to business objects 246. Business objects represent a business object in the real world, such as a purchase order. Business objects describe information, operations, and interactions associated with a business process. By invoking methods, such as BAPIs (Business Application Programming Interface), external applications can access and manipulate the business objects. Here, the term "business object" is used to refer to business process object, master data object, and mass data run object (MDRO). If a business object has more than one status scheme for a given business object node, then the status scheme to be used in the generation of the multi-dimensional business process model is determined. The determined status scheme is stored as an attribute on the connection between the business object node and BPVT 242. In addition, modeling tool 140 identifies interactions with other process components 248 used by the BPVT 242. The interactions may be outbound interactions as shown in the BPVT model 240 or inbound interactions.

In addition to BPVT models, modeling tool 140 may use additional model types, such as a status and action model (SAM), when generating a multi-dimensional business process model. FIG. 2E illustrates an enriched SAM 250. This example SAM 250 includes customer invoice SAM 252. SAM 252 includes actions 254a-d and statuses 256a-c associated with the customer invoice business object.

Modeling tool 140 uses SAMs to generate process flow models. Modeling tool 140 flags actions in SAM 252 that are used in generating a process flow model. Modeling tool 140 may identify the existing modeled outbound agents and automatically flag those actions which set statuses that trigger outbound agents or task agents. Flagged actions indicate when an operation or task is called. For example, modeling tool 140 may flag actions 254a, 254b, and 254d as triggering outbound agents or task agents based on selected status values 258a-b for statuses 256a-b, respectively. For those actions which can set more than one status value in an exclusive-or (XOR) mode (e.g, the action "check consistency" 254a can set the values "consistent" 258a or "inconsistent"), modeling tool 140 adds a link to the relevant configuration. This configuration can be a link to a configuration table in an application platform. This link may serve as information to the customer to indicate where the configuration may be changed.

FIG. 2F illustrates process component interaction models 260a-d that modeling tool 140 may use to generate the multi-dimensional business process model. Models 260a, 260b, and 260d show interactions between process components 262a-b, 262c-d, 262e-f, and 262g-h, respectively. In particular, models 260a-b show inbound and outbound interactions between the customer invoice processing process component and other process components. Each of process components 262a-h includes one or more business objects 264, process agents 266, and inbound and/or outbound interfaces 268. Each interface 268 includes one or more operations 269. Each operation 269 interfaces with a business object that connects to an operation in another process component.

Figure 2G:
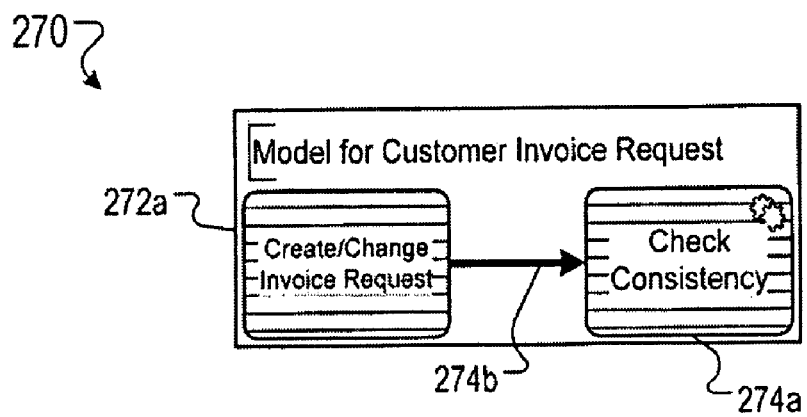
Figure 2G:
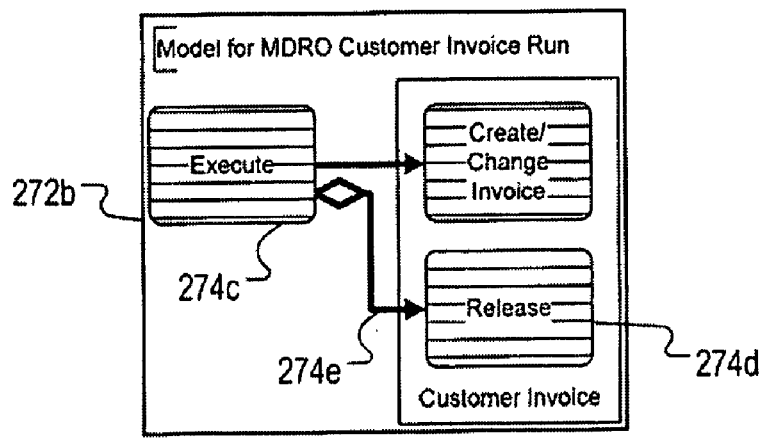
Figure 2G:
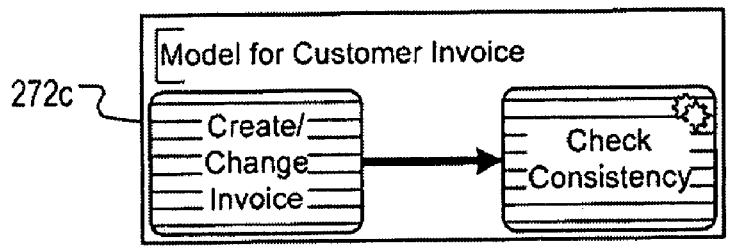

FIG. 2G illustrates business object flow models 270 that modeling tool 140 may use to generate the multi-dimensional business process model. There may be one business object flow model for each business object. More precisely, there may be one business flow model per business process object, master data object, and mass data run object. Models 270 include models 272a-c corresponding to the customer invoice request business process object, the customer invoice run mass data run object, and the customer invoice business process object, respectively.

Modeling tool 140 indicates which actions of the same business object or another business object are automatically called during creation of the business object. For example, during creation of the "customer invoice" business object, a "check consistency" action 274a is automatically called, as indicated by edge 274b. Modeling tool 140 indicates which actions automatically call another action of the same business object or another business object. For example, execute action 274c of the "customer invoice run" mass data run object automatically calls release action 274d of the customer invoice business object, as indicated by edge 274e. If a call depends on configuration parameters, such as the call represented by edge 274e, a link to the configuration may be provided.

FIGS. 3A-3E illustrate example techniques for transforming the models of FIGS. 2D-2G Into the multi-dimensional business process model. In some cases, the modeling tool 140 may first receive a BPVT selection from a user, such as customer invoice processing standard 242. Modeling tool 140 retrieves BPVT model 240 based on selected BPVT 242, which may be linked to process component 244. Modeling tool 140 retrieves business objects 246 from BPVT model 240 that are associated with BPVT 242. For each business object, modeling tool 140 retrieves a status schema associated with the business object. A business object may have multiple associated status schemas. A status schema may be selected by a user or modeling tool 140 if indicated in BPVT model 240. Modeling tool 140 can then retrieve status schemas from repository 105.

FIG. 3A illustrates flow models 320 created by modeling tool 140 during transformation step one. Modeling tool 140 derives flow models 320 from corresponding SAMs based on allowed flow models. Allowed flow models are based on the selected status schemas. For example, referring to FIG. 2E, SAM 252 includes allowed status values 258a and 258b.

This transformation step begins with modeling tool 140 creating actions 322a-b, 322c-f, and 322g within the customer invoice request, customer invoice, and customer invoice run business objects, respectively. Modeling tool 140 may connect actions 322a-g with edges using a particular set of rules. For example, if an action sets a status value that enables another action, modeling tool 140 may connect the actions with an edge. In another example, modeling tool 140 may connect three or more actions using a logical AND or a logical OR element, such as where an action is based on more than one action or an action changes a status that enables more than one action.

Figure 3B:
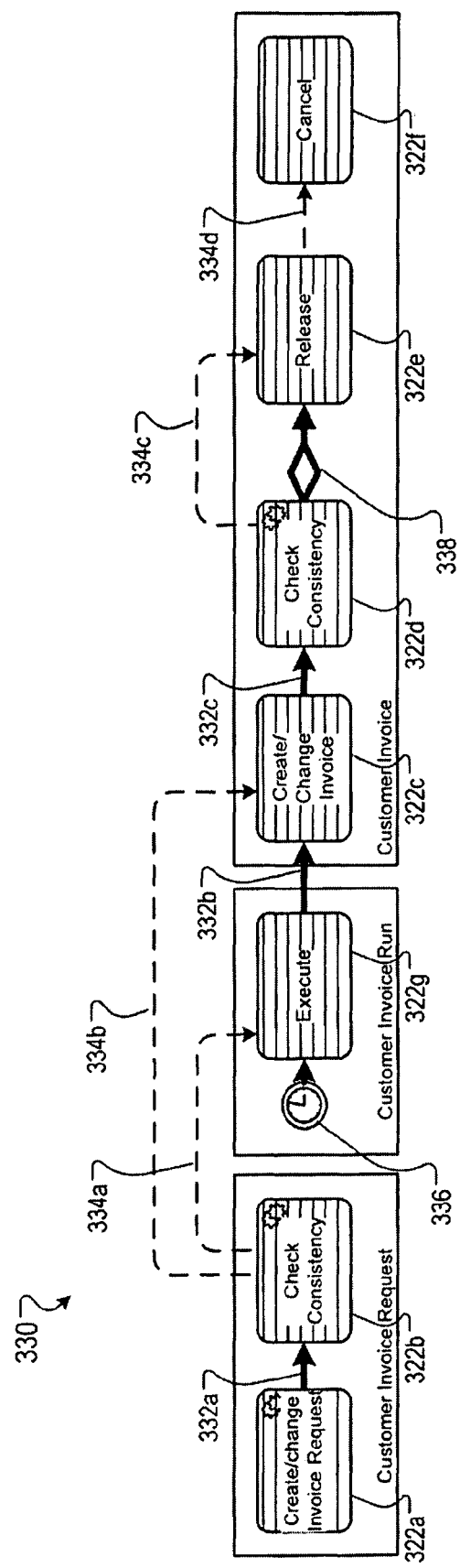

FIG. 3B illustrates flow model 330 having actions linked by edges 232a-c, 234a-d, 236, and 238 during transformation step two. In transformation step two, modeling tool 140 generates automatic flow edges 232a and 232c between creation action 322a and check consistency 322b, and creation action 322c and check consistency 322d, respectively. Modeling tool 140 retrieves the business object flow models related to the customer invoice, customer invoice request, and customer invoice run business objects. If one action triggers another action, modeling tool 140 inserts an automatic flow edge, such as edge 332b, between execute action 322g and create action 322c. Modeling tool 140 also adds any manual flow edges 334a-d, scheduled automatic flow edges 336, and configured automatic flow edges 338.

Figure 3C:
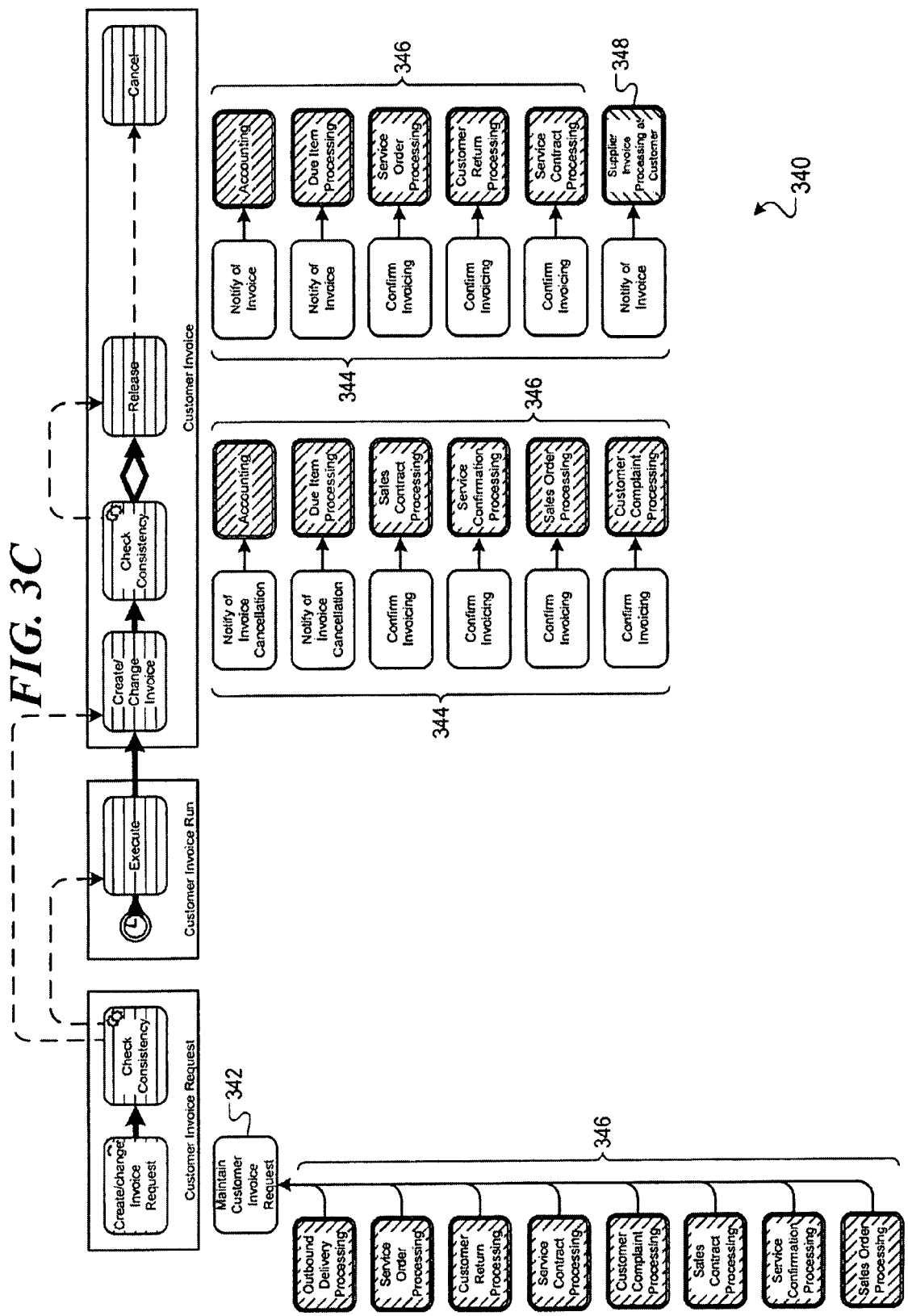

FIG. 3C illustrates flow model 340 including process component interactions associated with the customer invoice, customer invoice request, and customer invoice run business objects during transformation step three. Modeling tool 140 retrieves BPVT model 240 associated with customer invoice processing. Modeling tool 140 retrieves BPVT models of additional BPVTs of process components involved in process component interaction models that include customer invoice processing standard BPVT 242. Modeling tool 140 retrieves process component interactions present in the retrieved additional BPVT models. Modeling tool 140 retrieves the process component interaction models (e.g., process component interaction models 260a-d) linked to the interactions. In some implementations, there may be more than one process component interaction model linked to one process component interaction. Modeling tool 140 retrieves the operations and agents of the current process component 244 which are present in those models and read the other process components linked to them. Modeling tool 140 determines that inbound operation 342, outbound operations 344, application-to-application (A2A) process components 346, and business-to-business (B2B) process component 348 interact with flow model 340.

Figures 1, 3D:
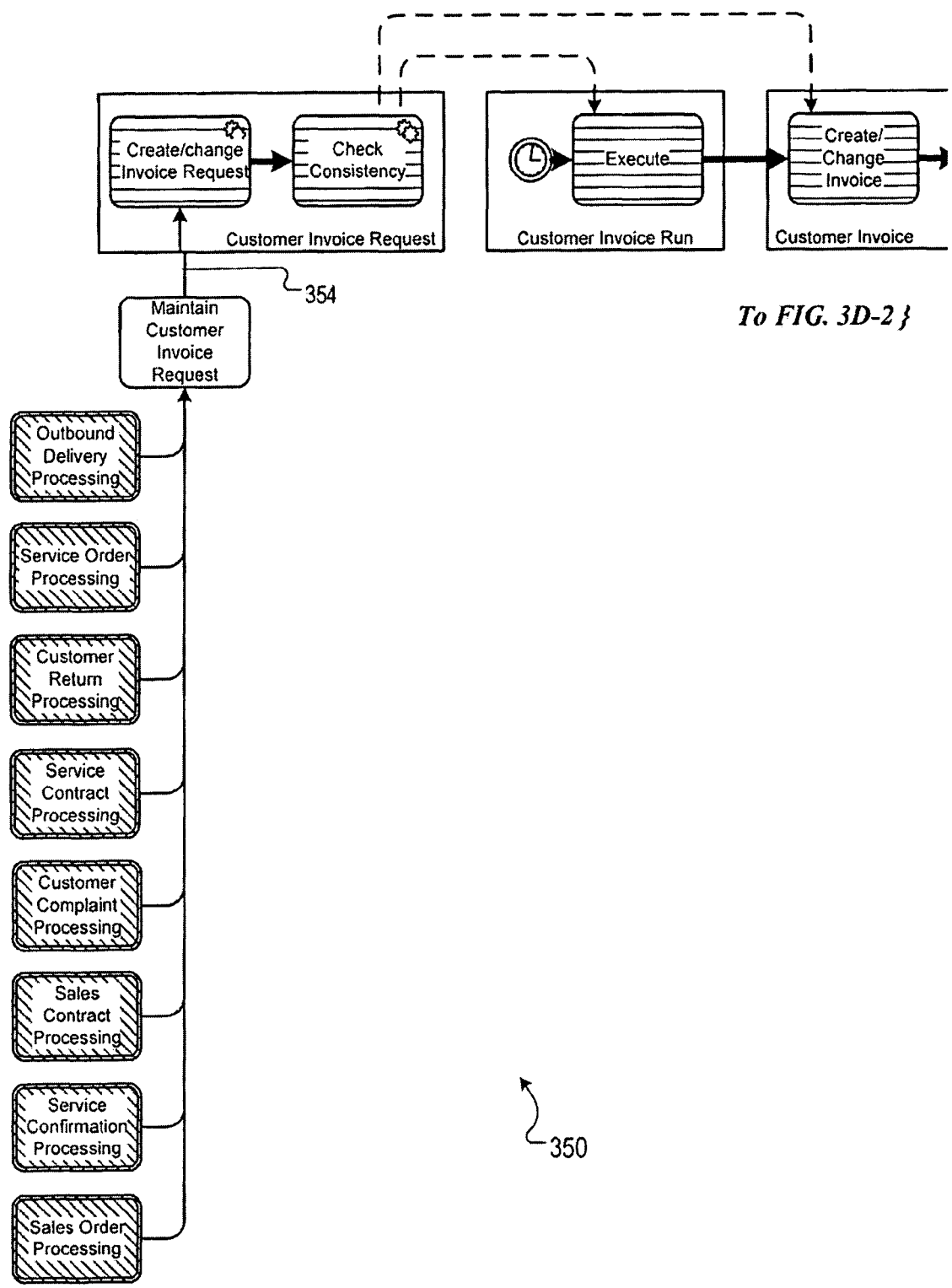
Figures 2, 3D:
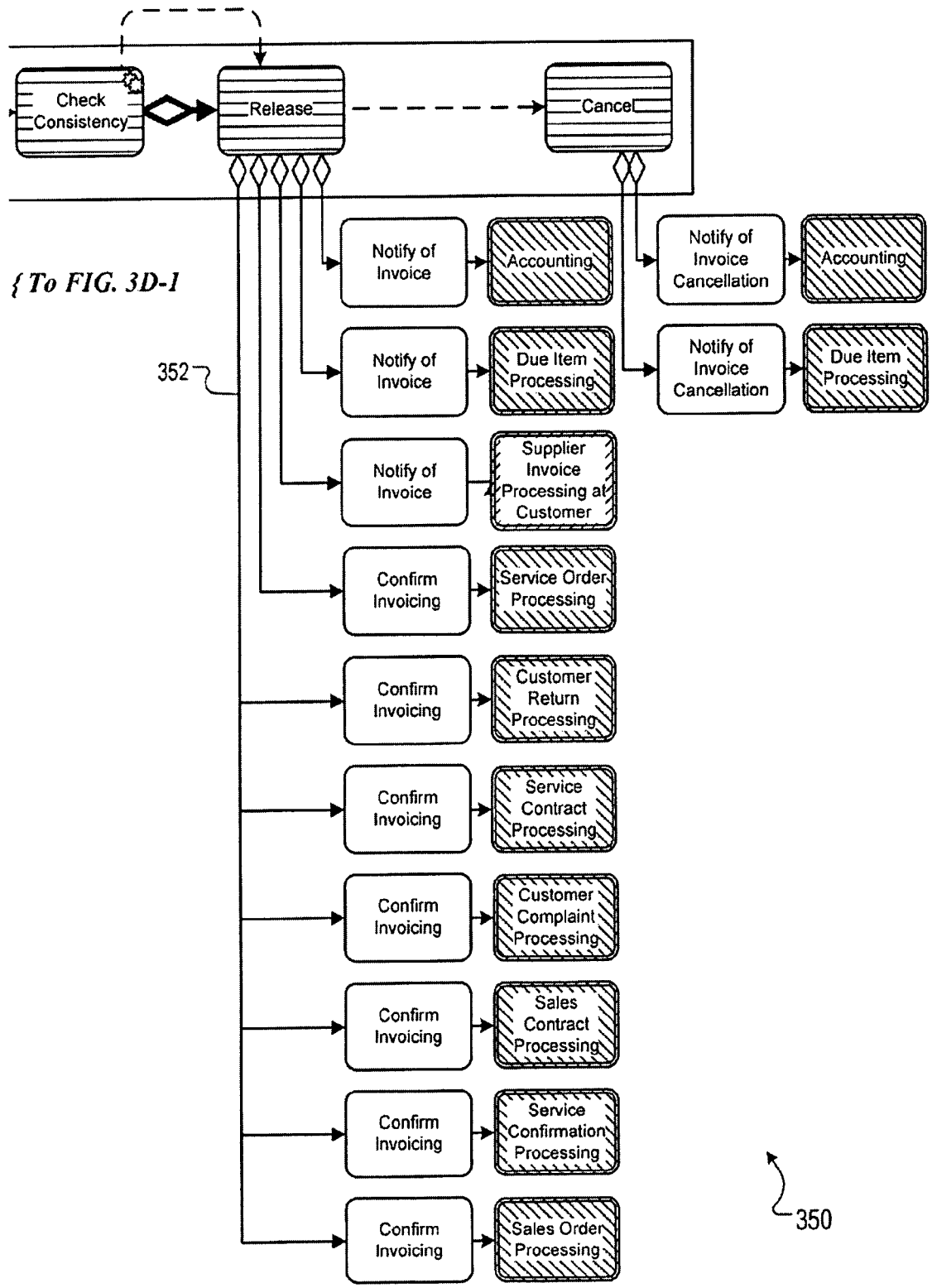

FIG. 3D illustrates flow model 350, including links added between operations and the customer invoice, customer invoice request, and customer invoice run business objects during transformation step four. Modeling tool 140 links asynchronous outbound operations to actions by automatic flow arrows pointing from the actions to the outbound operation (e.g., edge 352). Modeling tool 140 links asynchronous outbound operations by retrieving the status values of the start condition of the asynchronous outbound agents. If one start condition exists, modeling tool 140 links the operation of the start condition to the actions which represent the action which is setting the status. If there are multiple actions which set the status, modeling tool 140 links the operation to the multiple actions. In some implementations, only one of the actions is shown in the final model after model reduction. Modeling tool 140 may apply the logic for start conditions to the status values of cancel conditions. If there are multiple status values linked with a logical AND, modeling tool 140 links the operation to the action which is later in the sequence of actions. Modeling tool 140 links the operation via a condition edge to an action. The condition represents the relevance condition. In some implementations, there may be multiple outbound operations linked to one action. Moreover, the edge may allow for navigation to the relevance condition and details of the start condition of the outbound agent. If the same action is linked to the same operation via multiple different outbound agents, then there are multiple edges shown in flow model 350, since the conditions may differ.

Modeling tool 140 links synchronous outbound operations to actions by automatic flow edges directed from the action to the operation and from the operation back to the action. Modeling tool 140 links synchronous outbound operations by retrieving the model of the synchronous outbound agent to obtain the information describing which action triggers the agent. Modeling tool 140 links the corresponding action with the operation.

Modeling tool 140 links asynchronous and synchronous inbound operations to actions using automatic edges (no conditions) directed from the operation to the action (e.g., edge 354). Modeling tool 140 links inbound operations by determining which actions the inbound agent is triggering.

Figures 1, 3E:
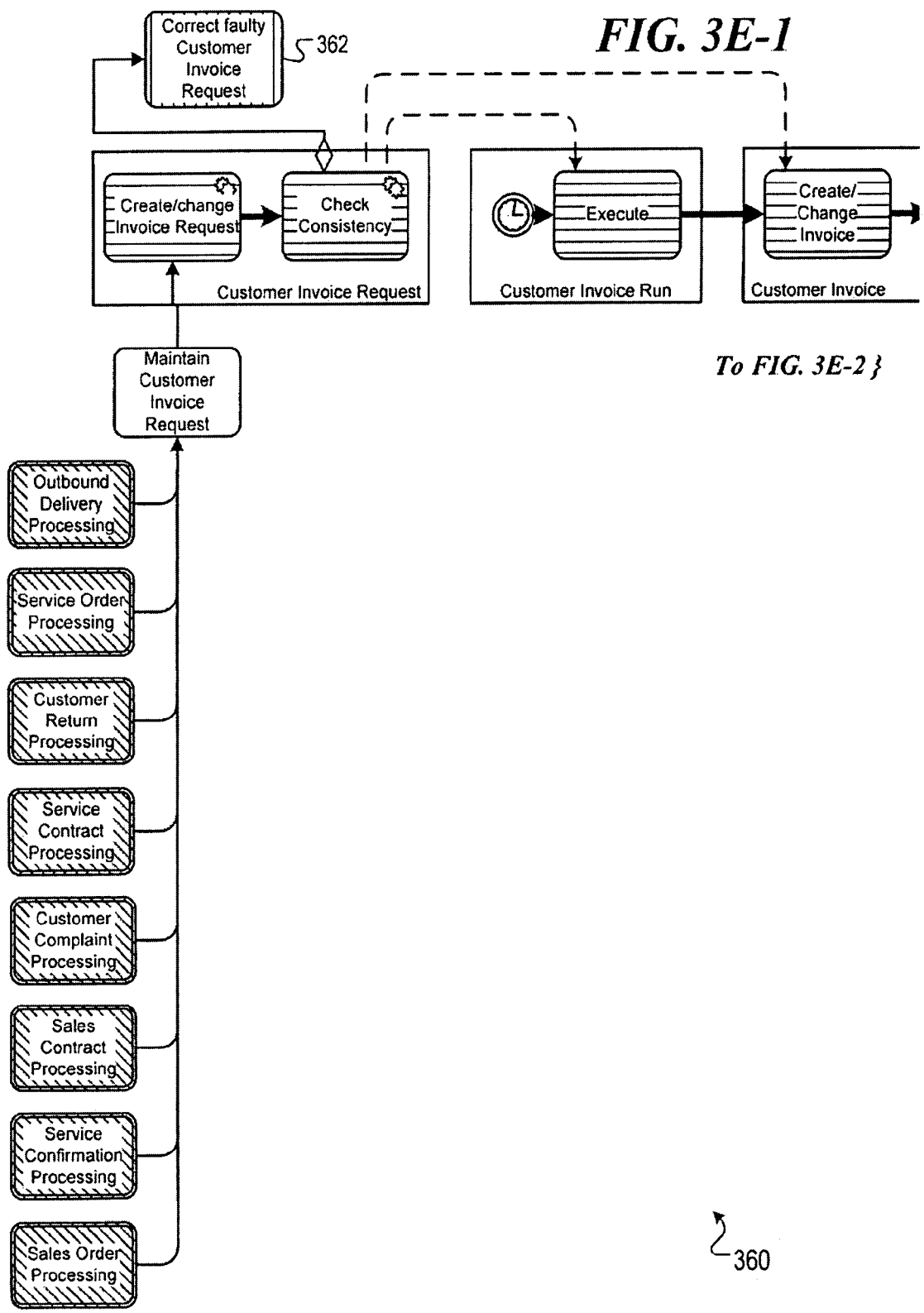
Figures 2, 3E:
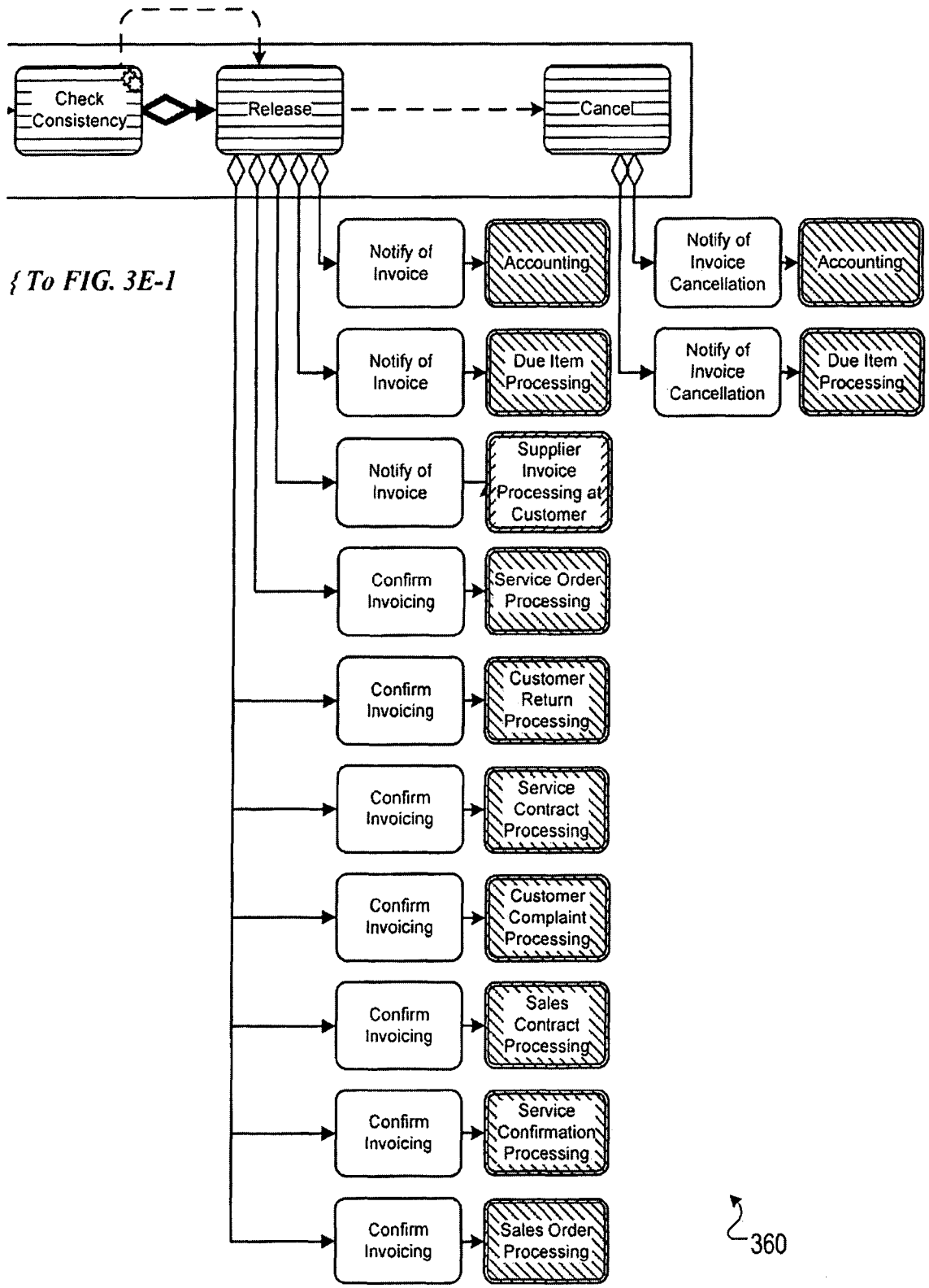

FIG. 3E illustrates flow model 360 including linked task 362 after transformation step five. Modeling tool 140 retrieves the business task model of the process component. Modeling tool 140 retrieves the task agents related to the customer invoice, customer invoice request, and customer invoice run business objects. Modeling tool 140 retrieves the status value out of the start condition. If there is only one status value, modeling tool 140 links the task type to the action that sets the status value. If there are multiple status values with a logical OR, modeling tool 140 links the task type to the multiple actions. If there are multiple status values with a logical AND, then modeling tool 140 links the task type to the action which is later in the sequence.

Figures 1, 4A:
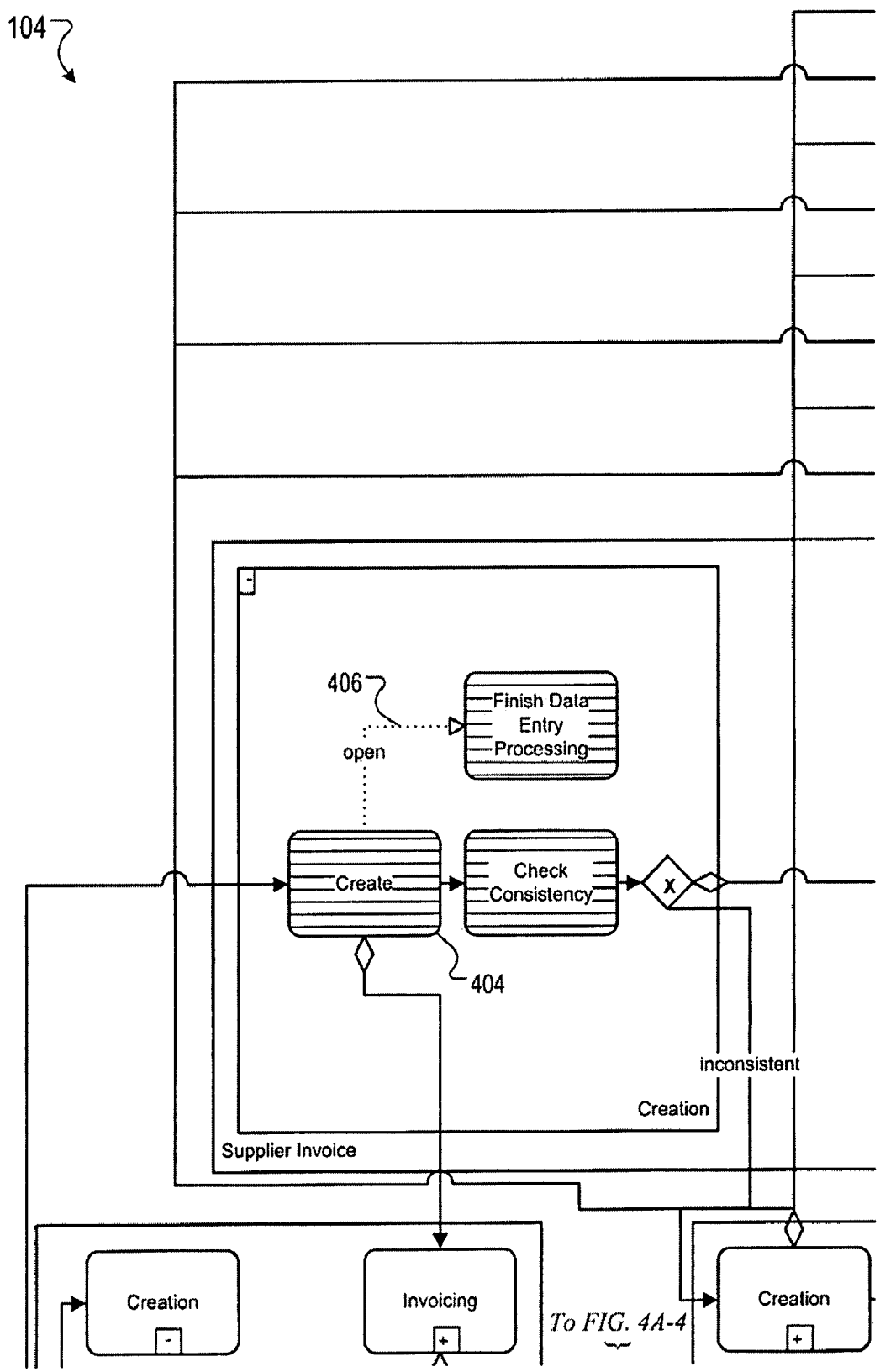
Figures 2, 4A:
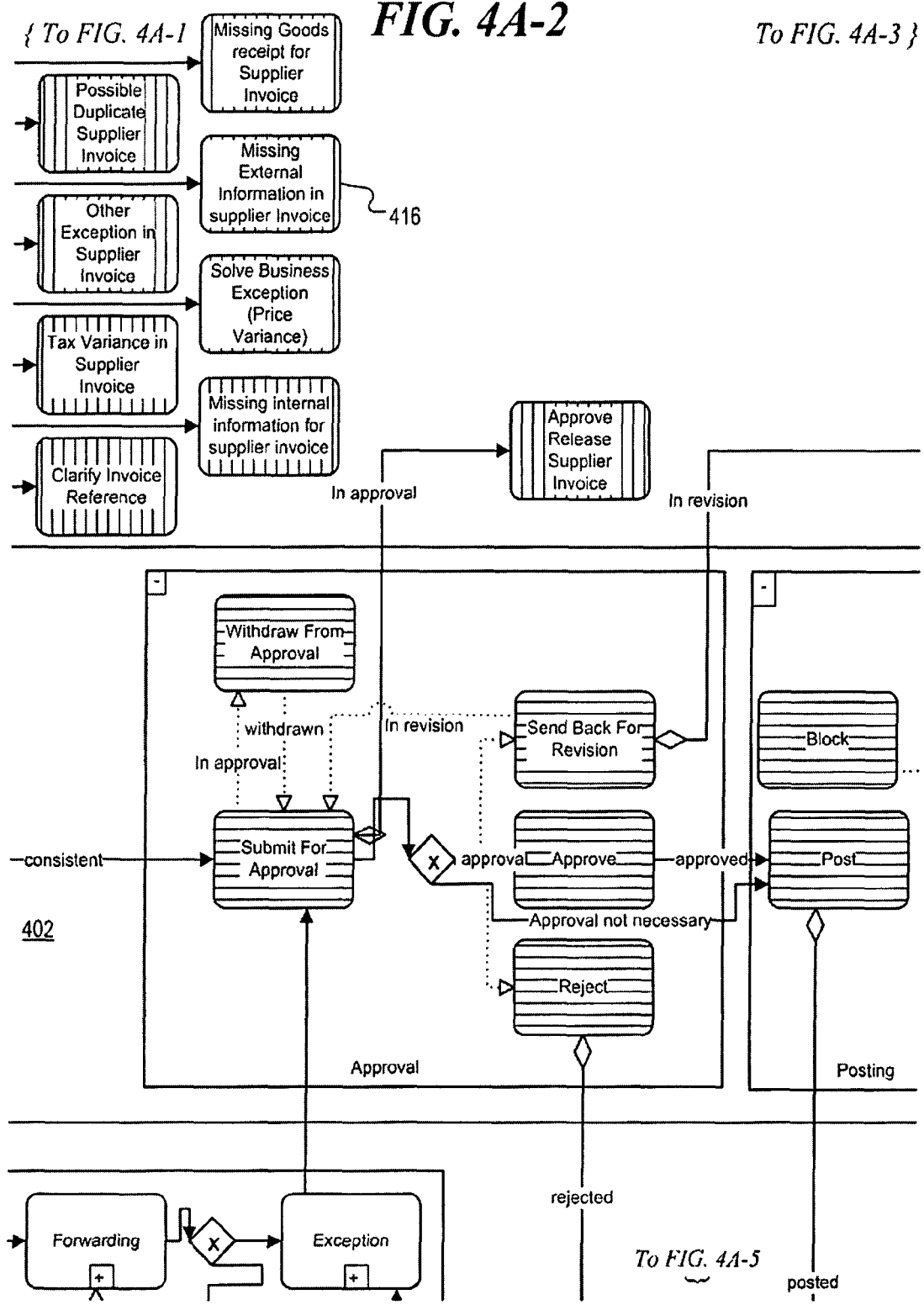
Figures 3, 4A:
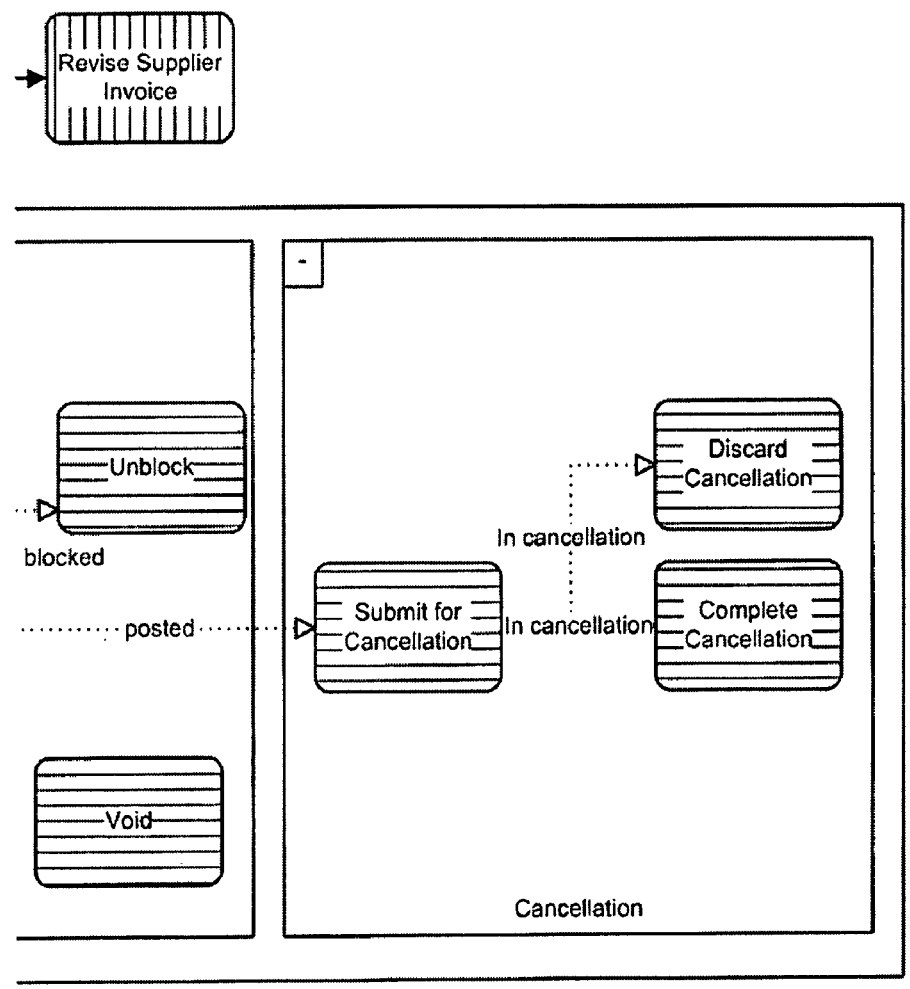
Figures 4, 4A:
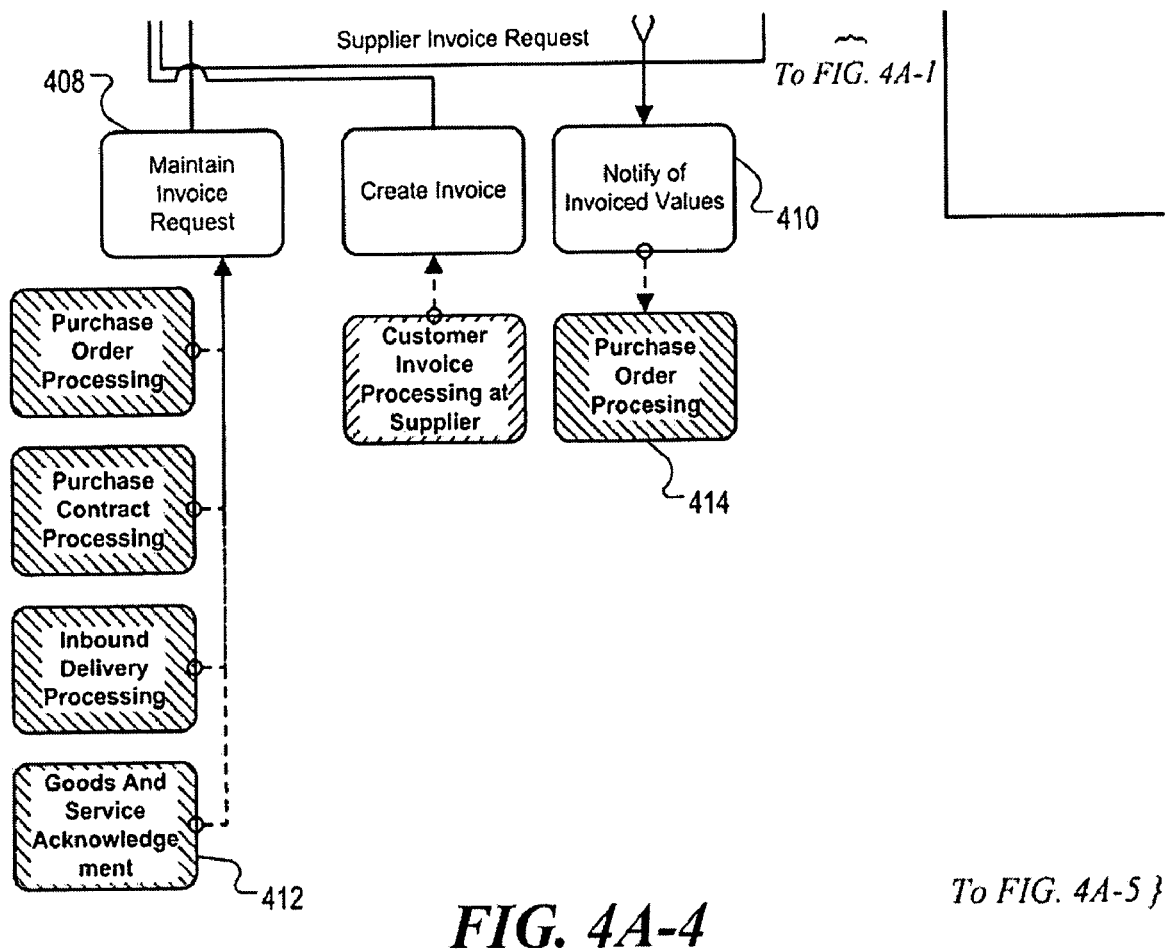
Figures 4, 4A, 5:
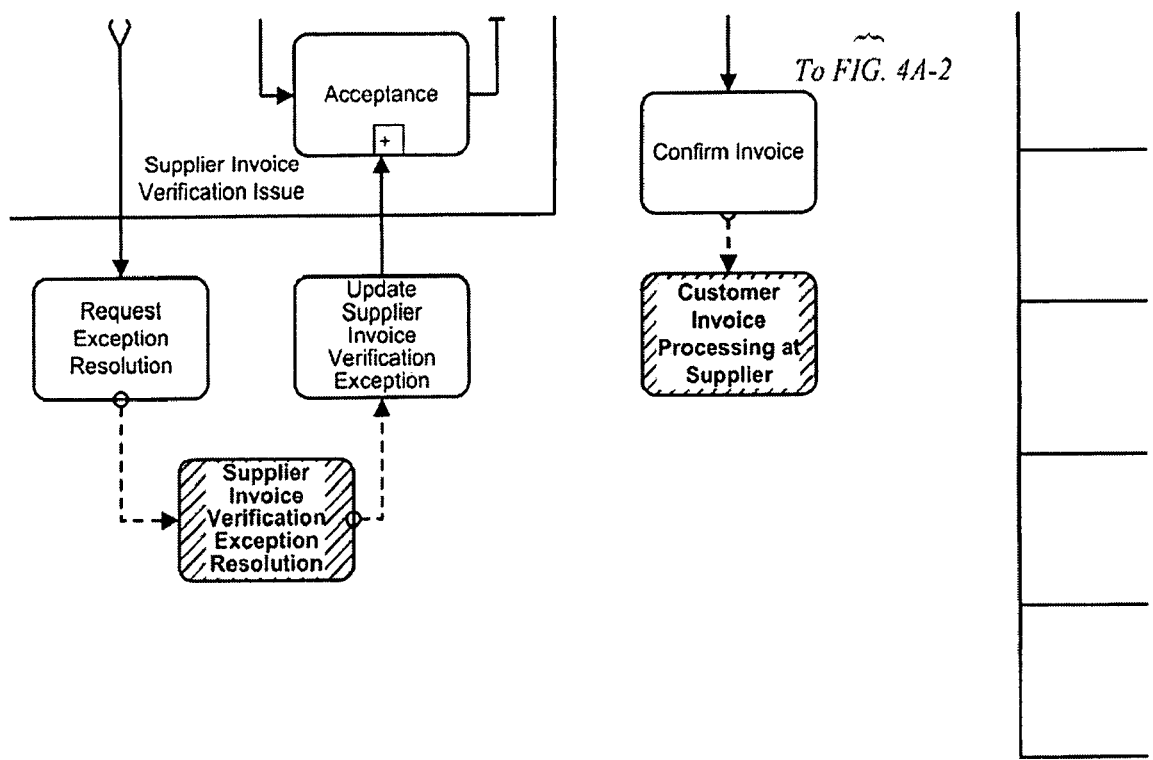
Figures 4, 4A, 5, 6:
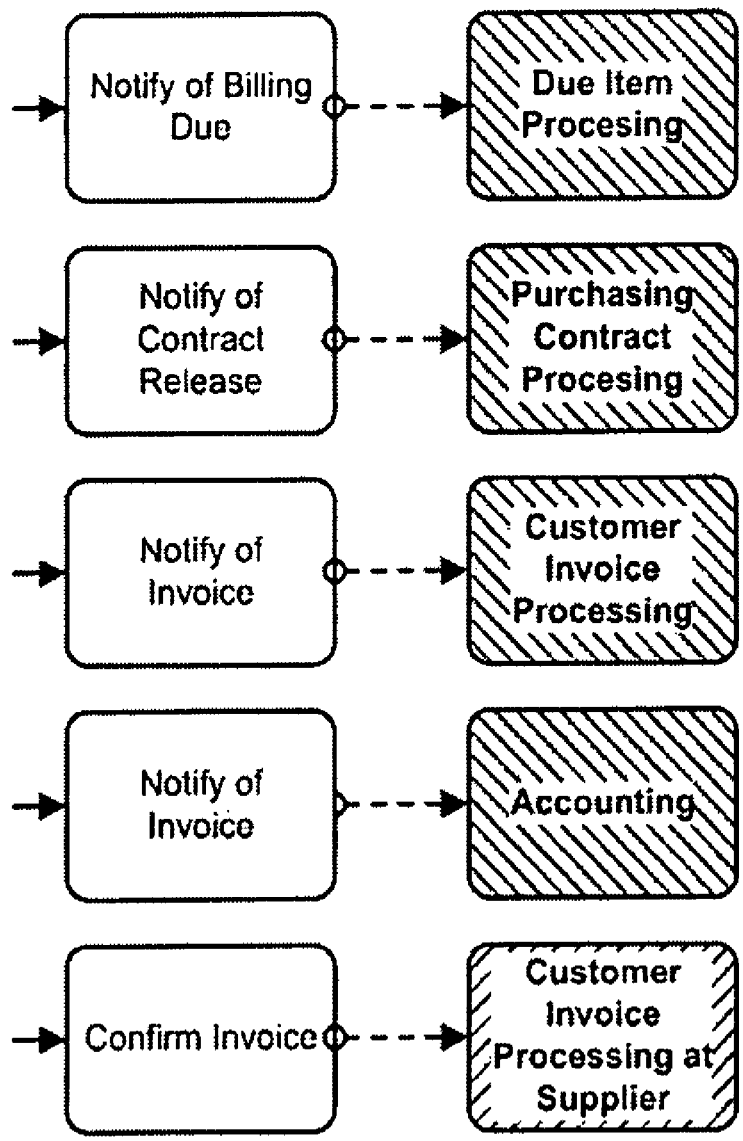

FIGS. 4A-B illustrate an example multi-dimensional business process model 104. This example shows supplier invoice processing instead of customer invoice processing explained in the first example. The multi-dimensional business process model 104 is generated using a variant of the process described with respect to FIGS. 3A-E. The multi-dimensional business process model 104 includes business objects (e.g., business object 402) for a particular process component. In this variant, actions are taken into account (instead of flagging important ones). The actions (e.g. action create 404) are grouped into process steps (e.g. "creation"). The process steps can graphically be collapsed or expanded to hide or show the actions the group respectively. The business objects include actions (e.g., action 404) and edges (e.g., edge 406) relevant to a particular status schema. The multi-dimensional business process model 104 also includes inbound and outbound operations (e.g., operations 408 and 410, respectively) that interact with the particular process component as well as process components (e.g., process components 412 and 414, respectively) associated with the operations. The multi-dimensional business process model 104 also includes tasks (e.g., task 416) associated with actions in the supplier invoice, supplier invoice request, and supplier invoice verification issue business objects.

FIG. 4B illustrates a legend 430 for various components of the multi-dimensional business process model 104. Component 432 represents a task. Component 434 represents a process step (e.g., a collection of actions). Component 436 represents an action. Component 438 represents an operation. Component 440 represents an A2A process component. Component 442 represents a B2B process component. Component 444 represents an automatic flow edge. Component 446 represents a conditional automatic flow edge. Component 448 represents a message flow edge. Component 450 represents a human triggered (manual) flow edge. Component 452 represents an exclusive OR split of flow. Component 454 represents an expanded process step. Component 456 represents a business object.

Figure 5A:
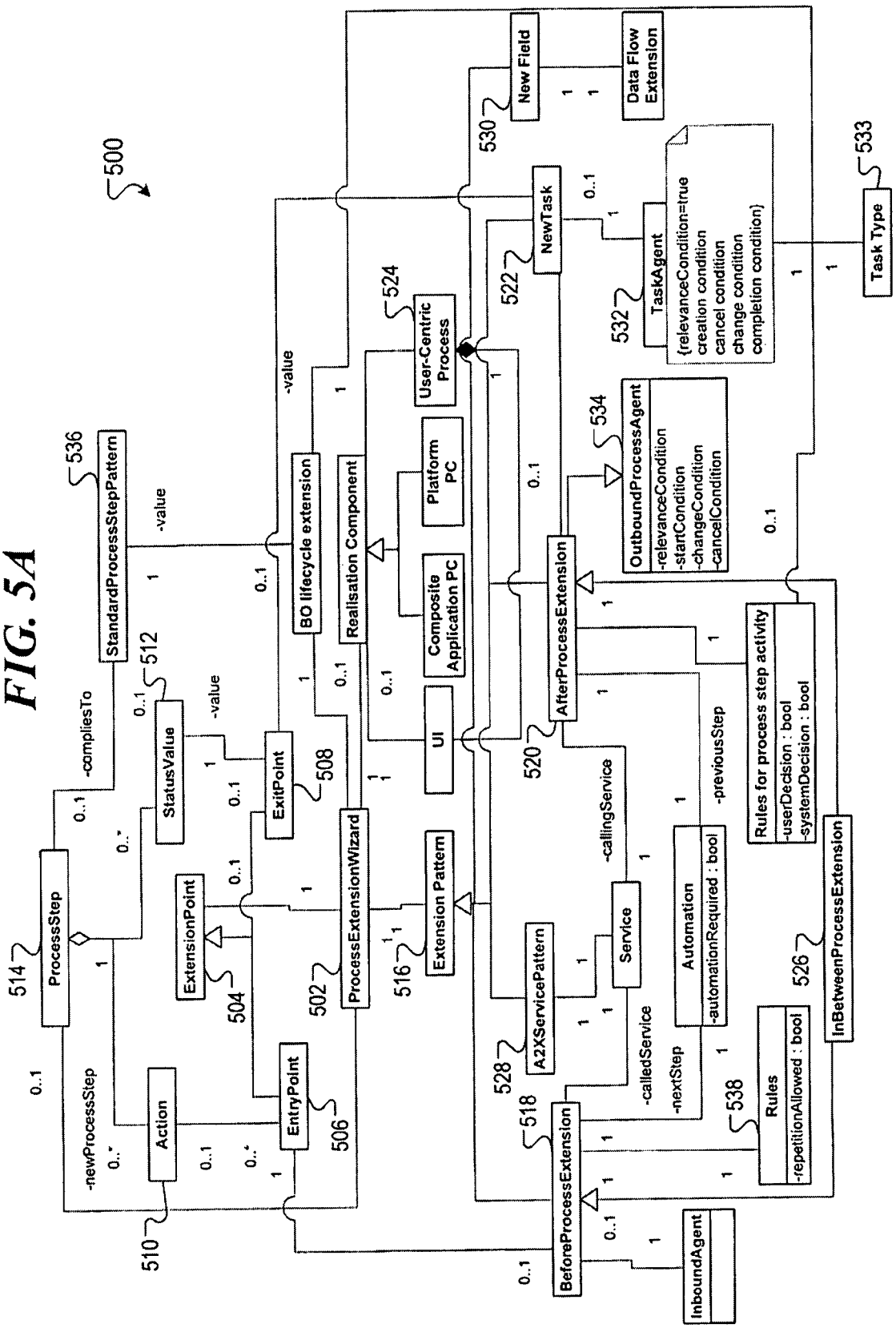
FIG. 5A illustrates an example metamodel of an extensibility wizard utilized by one implementation of the system of FIG. 1.

FIG. 5A illustrates an example metamodel 500 of the extensibility wizard 118 utilized by one implementation of the system 100 of FIG. 1. More specifically, FIG. 5A includes example entities involved in process extension. Metamodel 500 includes process extension wizard 502. Process extension wizard 502 extends a flow model via extension points. A user may extend a process component. By use of designated patterns a user can add SAM actions, composite process components, services, and business tasks as well as process agents, BPVTs, business configuration content, and task agents. In addition, process extension wizard 502 adds connections between the different entities to the process flow model. In some implementations, process extension wizard 502 creates underlying models in an extension layer showing an abstraction as extended flow model. Wizard 502 can show the working queue and identifies underlying models which are not 'complete' for the user. For example, wizard 502 may identify an empty process agent or a task type that is not activated. Wizard 502 manipulates the model based on extension patterns chosen by the user as well as answers provided by the user to questions posed by wizard 502. The user can insert names into new entities. The user can navigate to the underlying models in order to complete them. If the user does extensions in the underlying models, then wizard 502 can regenerate the flow model in order to determine if the user has made any conflicting changes to the model. Wizard 502 stores the extension patterns and answers to questions which the user has provided. Using the stored patterns and answers wizard 502 allows the user to undo extensions.

Metamodel 500 includes extension points 504. Extension points 504 maintain application platform integrity during extension of the model. Wizard 502 determines at which locations the model may be extended. Extension points 504 are shown in the flow model at a process step level. Extension points 504 define where the user can make an extension and wizard 502 automatically determines possible extension patterns that are allowed (those patterns are shown actively to the user). Extension points 504 may be specific to process components. An extension point may be an entry 506 and/or exit point 508 corresponding to actions 510 and status values 512, respectively. A process step 514 can have 0-n entry 506 and/or exit points 508. Entry points 506 are shown on the left of process steps 514 and exit points 508 are shown on the right of process steps 514 when presented by wizard 502 to a user. Allowed pattern extensions for entry points 506 include Add Before extensions and Add in Between extensions. Allowed pattern extensions for Exit Points 508 include In Between extensions, Add After extensions, Add Task extensions, and Start User-centric process extensions.

Metamodel 500 includes extension patterns 516. Extension patterns include before process extensions 518, after process extensions 520, new business task extensions 522, start user-centric process extensions 524, in between process extensions 526, add A2X service extensions 528, and add held extensions 530.

Before process extension 518 occurs when a user adds a new, externally provided process which is run before an application platform process is started. Before process extension 518 triggers the application platform process (typically) asynchronously. In some implementations, some process components use the same operation for inbound operations, such as customer invoice processing. If the same inbound operation or service is used, then wizard 502 asks the user the question, "Do you want to reuse the following service?" and presents the service to the user. In one scenario, a user selects extension point 504. Depending on the extension point 504, wizard 502 presents extension patterns 516 that are allowed given selected extension point 504. The user chooses new before process extension pattern 518. If the extension point 504 is positioned on a process step 514 which contains more than one action 510 having an entry point 506 for this pattern 518, the process step 514 is expanded and wizard 502 prompts the user has to select an extension point on an action. Wizard 502 then prompts the user to input names for new entities such as composite process components and operations. Wizard 502 may present default or initial names such as "Maintain <BO>" for operations and " . . . Processing" for the composite process components. The user may complete the names. If the user is reusing a service, then wizard 502 presents agent rules for the user to adapt. If the user is not reusing a service, then wizard 502 derives the name of the agent from the name of the composite process component inserted by the user (e.g., "Maintain <BO> based on <Composite Process Component>"). Wizard 502 creates a new process component interaction model. Wizard 502 may also extend or create processing component process variant type, BPVT model, and/or process component model. Wizard 502 also outputs agents, interfaces, operations, and messages resulting from the extension made by the user. Wizard 502 identifies incomplete entities for the user.

After process extension 520 occurs when a user adds a new, externally provided process which is triggered asynchronously from within an application platform. In some implementations, existing application platform processes are not affected by after process extensions 520. In one example, a user extends the model for Intrastat (a system of collecting information and producing statistics on the movement of goods between Member States of the European Union) to provide data from customer invoice processing (and Supplier Invoice Processing). Wizard 502 extends the model by adding an outbound agent, interface, and operation to send the data. Again, tire user selects the extension point 504 where the extension is to occur. The user selects the new after process extension 520. If the extension point 504 is positioned on a process step which contains more than one action having an entry point for this pattern 520, the step 514 is expanded and the wizard 502 prompts the user to select an extension point on an action. Wizard 502 asks the user, "Do you want to reuse a service?" If the user does not want to reuse a service, then wizard 502 prompts the user to input names for new entities such as composite process components and operations. The wizard 502 may propose "Inform of <BO>" for operations and " . . . Component" for the process components. The user may complete the names. If the user is reusing a service, wizard 502 presents agent rules to the user for the user to adapt. Otherwise, wizard 502 may determine the agent name from the name of the composite process component provided by the user (e.g., "Maintain <BO> based on <Composite Process Component>"). Again, wizard 502 creates a new process component interaction model. Wizard 502 may also extend or create processing component process variant type, BPVT model, and/or process component model. Wizard 502 also outputs agents, interfaces, operations, and messages resulting from the extension made by the user. Wizard 502 can typically identify incomplete entities for the user. In some implementations, the underlying models are completed test-ready by the wizard. For example the relevance condition, start condition, change condition, or cancel condition for an outbound process agent 534 are filled. Conditions are different depending on the fact if it's a synchronous or asynchronous process agent. The outbound process agent can be created in two systems: in an enterprise services repository (ESR) and the corresponding proxy in backend system, perhaps containing automatically created coding.

New business task extensions 522 may occur during preconfiguration and/or configuration of BTM tasks at design time in fine tuning user interfaces (e.g., adapt deadline, change responsibility category, change default priority, change title, change description. In another example, new business task extensions 522 may occur after a project manager has assigned a resource to a project, a BTM task is triggered that informs the resource about a start, end, and duration of a new project task. A task may be added to trigger a local user-centric process. Wizard 502 adds a new business task agent and task type to an existing process component. A business object triggers the task creation via a task agent. Wizard 502 prompts the user to select which action is the 'main' condition to trigger task creation. Each action 510 in the flow model may be a candidate for this condition, or more specifically, the status value 512 an action 510 sets during execution. The user selects the extension point 504. The user selects new business task extension 522. If the extension point 504 is positioned on a process step which contains more than one action having an entry point for this pattern 522, the step 514 is expanded and wizard 502 prompts the user has to select an extension point on an action. Wizard 502 prompts the user to input a name for the new task. Wizard 502 prompts the user to select a usage type from a list of possible usage types. The user may also input attributes for task agent and task type. Wizard 502 determines a task agent name from the task name input by the user. Wizard 502 creates and/or extends the process component task model. Wizard 502 creates a task type 533 and a task agent 532 in an extension layer. The conditions for the task agent are often created ready-to-test in backend, particularly relevance condition, start condition, change condition, cancel condition and completion condition. The task type can be created in backend and attributes, such as i) responsible user and ii) the GUI presented if the task is created, are prefilled ready-to-test.

Start user-centric process extension 524 occurs when a user adds a new, externally realized user-centric process. This is triggered asynchronously from within the application platform. In some implementations, existing application platforms processes are not affected. A user selects the extension point 504. The user selects the start user-centric process extension 524. If the extension point 504 is positioned on a process step which contains more than one action having an extension point for this pattern, the step 514 is expanded and wizard 502 prompts the user has to select an extension point on an action. Wizard 502 asks the user the question, "Do you want to reuse the following service?" Wizard 502 presents the service to the user. Wizard 502 prompts the user to input a name of the user-centric process. If a service is not reused, then wizard 502 prompts the user to input names for new entities such as operations. Wizard 502 may propose names. The user may complete the names. If a service is not reused, then wizard 502 determines the agent name from the name of the composite process component inserted by the user. Again, wizard 502 creates a new process component interaction model. Wizard 502 may also extend or create process component process variant type, BPVT model, and/or process component model as well as Status and Action model (S&AM). For this, the wizard 502 determines which status scheme 536 is to be extended. Depending on the process step template 536 chosen, the status scheme is extended via a process step 514, one or more actions 510, one or more status value 512 as well as connections between them. For each of these entities corresponding entities are often created in the ESR as data type extensions attached to the business object, which is manipulated by the wizard 502. Additionally the corresponding proxies are often created in backend by wizard 502. Wizard 502 also outputs agents, interfaces, operations, and messages resulting from the extension made by the user. Wizard 502 identifies incomplete entities for the user.

New in between process extensions 526 may be asynchronous or synchronous, sequential or parallel, and mandatory or optional. If in between process extension 526 is optional the user may define multiple possibilities under which the step 514 is executed. This may affect underlying models such as process agents and SAM. A new process step is typically realized in a composite process component. In some instances, wizard questions whether it should be created in user-centric component or process component. The additional process or process step is triggered by an application platform business object via a message. When the composite process component executes the process step, the process step sends data back to the same process component. For example, in the case of a sequential asynchronous in between process, such as "Professional Services," project processing gives project and task data such as start, end, and duration to the new composite process component "Workforce processing." Wizard 502 searches for resources and when found, the resources are given back to project processing. A new action within project processing is needed which changes the status of a task from open to staffed. For example, in the case of a sequential asynchronous in between process, if a parcel has to be shipped, "Logistics Execution" sends data to a composite process component of a "Shipper." The shipper finds out which "Carrier" can transport the parcel. When a suitable carrier is found, the information is sent back to "Logistics Execution." In another example, for a parallel process step realized in a composite process component an additional credit check is called during "Sales Order" creation. The step is executed in another process component and triggered by application platform business object "Sales Order." When a sales order is created several steps like consistency check and ATP check are executed. In addition the credit check may be executed in parallel before processing in supply chain management continues. The standard process continues if the new process step is executed. This can be ensured via creation of constraints (the connections which are inserted into S&AM scheme mentioned above). Additionally the user can decide whether to execute the new process step for each business object instance or only for some. Outbound delivery can send deliveries for packages to the carrier, while the others are executed in standard process. For this, the wizard 502 creates rules 538 deciding for which instances the process step is active and for which ones not.

New in between process extension 526 may begin with a user selecting the extension point 504. The user selects new in between process extension 526. If the extension point 504 is positioned on a process step which contains more than one action having an entry point for this pattern 526, the step 514 is expanded and wizard 502 prompts the user to select an extension point on an action. If there are multiple connections going from the action to other actions/process steps, wizard 502 prompts the user to select an extension point before which the process step 514 is inserted. If the user selects a process step having more than one action with extension points, the step 514 is expanded and wizard 502 prompts the user to select an extension point on an action. Wizard 502 asks the questions. "Is the new process a sequential in between process?" and, "Is the new process asynchronous?" If the process is not asynchronous, wizard 502 asks, "Is the new process realized synchronously in a composite process component?" If the process is not realized synchronously in a composite process component, wizard 502 asks, "Is the new process realized within a new process step residing in this process component?" Wizard 502 asks. "Do you want to reuse the following service choreography?" and wizard 502 presents the choreography to the user in the form of a process component interaction model. Wizard 502 asks, "Is the new process step optional?" Wizard 502 asks, "Will the action following the extension be called automatically?" Wizard 502 asks, "Will the extension action be called automatically?" If a service or process component is not reused, wizard 502 prompts the use to input names for new entities such as composite process components, outbound operations, and inbound operations. The wizard 502 may propose names such as "inform of <BO>" for Outbound Operation, "Execute Action" for inbound operation, and " . . . Processing" for the Composite Process Component. The user may complete the names. Wizard 502 extends the SAM based on the new process step. If a service is not reused, then wizard 502 determines the agent name from the name of the composite process component inserted by the user. Again, wizard 502 creates a new process component interaction model. Wizard 502 may also extend or create processing component process variant type, BPVT model, and/or process component model. Wizard 502 also processes, manages, or implements inbound and outputs agents, interfaces, operations, and messages, as well as status scheme extensions and business configuration resulting from the extension made by the user. Wizard 502 identifies incomplete entities for the user.

Add A2X service extension 528 may be used if a new user interface or user-centric component accesses application platform core services. If the core service is an action and appears in SAM for the process variant, a user may extend the process step the core service is located in by selecting the action. Then the user selects pattern "Add A2X Services" 528. Alternatively, the user may select the pattern "Add A2X Service" 528 without having selected a core service. Wizard 502 then presents a list of core services form which the user may select. Wizard 502 creates a new interface, operation, and (perhaps synchronous) agent. In some implementations, the agent is a generic one and signature, mapping, and coding are generated in the ESR and backend.

Add field extension 530 occurs when a user adds a new field to a business object. In addition, a user may use a field from a business object in another business object. The user may select a business object and then pattern "add field" 530 or the user may select a pattern "add field" 530 and then select a business object from a list presented by wizard 502. Wizard 502 presents the business object node structure. The user selects a node from the structure. The user may input text meta data such as name, type, and technical name. Wizard 502 asks, "Do you want to create value help for the new field?" If the user answers yes, then the user may input data for value help such as fixed values. Wizard 502 asks, "Do you need data flow extension, i.e. shall the field be reused in other BOs?" If yes, then the user selects from a list the possible data flow extensions. Wizard 502 asks, "Will the field be used on (dropdown list) UI/Report/form?" If yes, then the user selects from a list the user interfaces, reports, and forms on which the field will appear. In some implementations, the field is not shown in the flow model. Wizard 502 may provide links that allow a user to navigate to the user interface, report, and/or form on which the field appears. Wizard 502 creates the field in the model, stores possible values for the field, enables navigation for the field, and (in the ease of data flow extension) creates a message type extension, which can include extensions in ESR and backend.

Figure 5B:
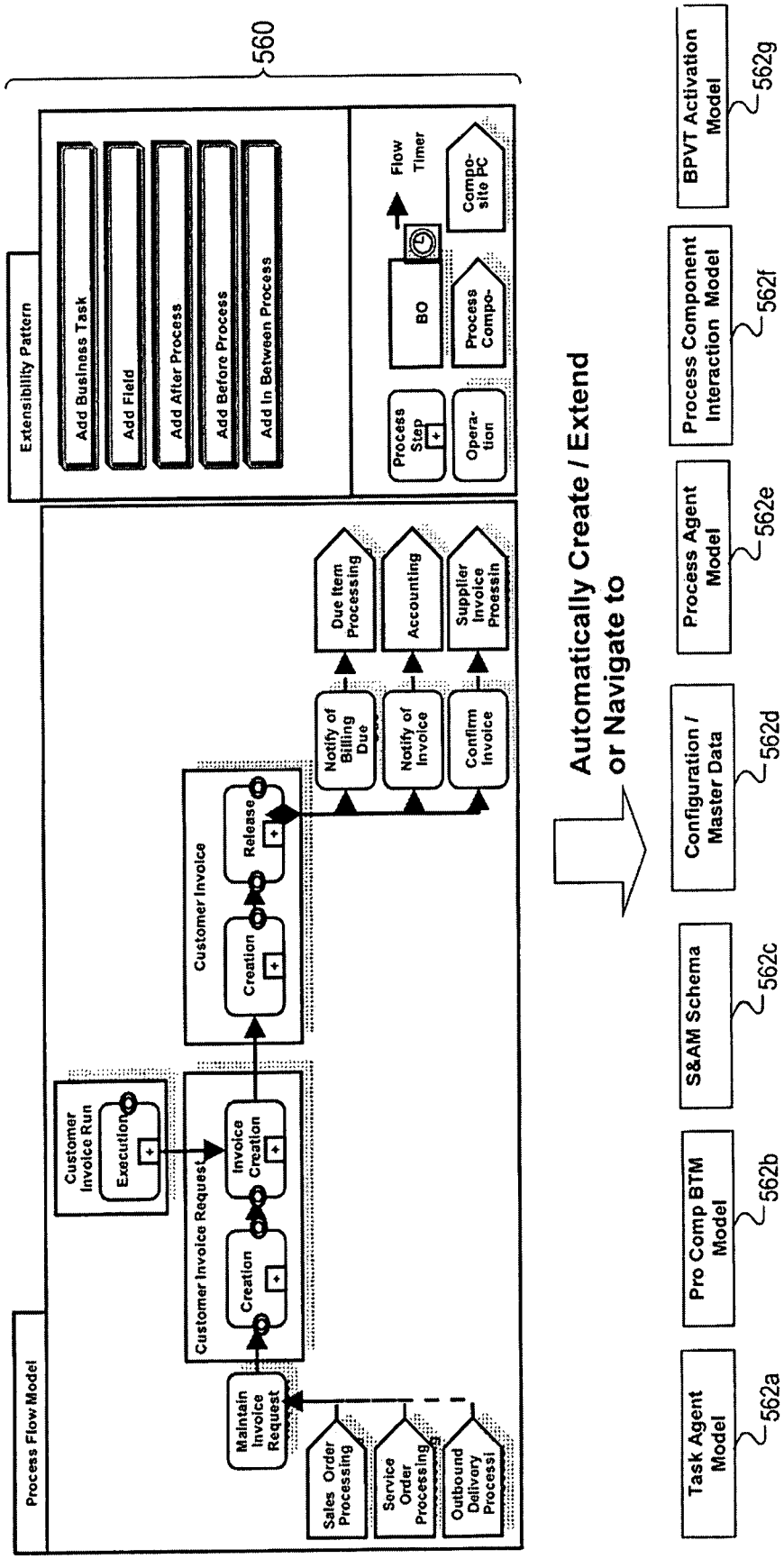
FIGS. 5B-C illustrate example diagrams involving creation (and coding) of underlying models and navigation possibilities.
Figure 5C:
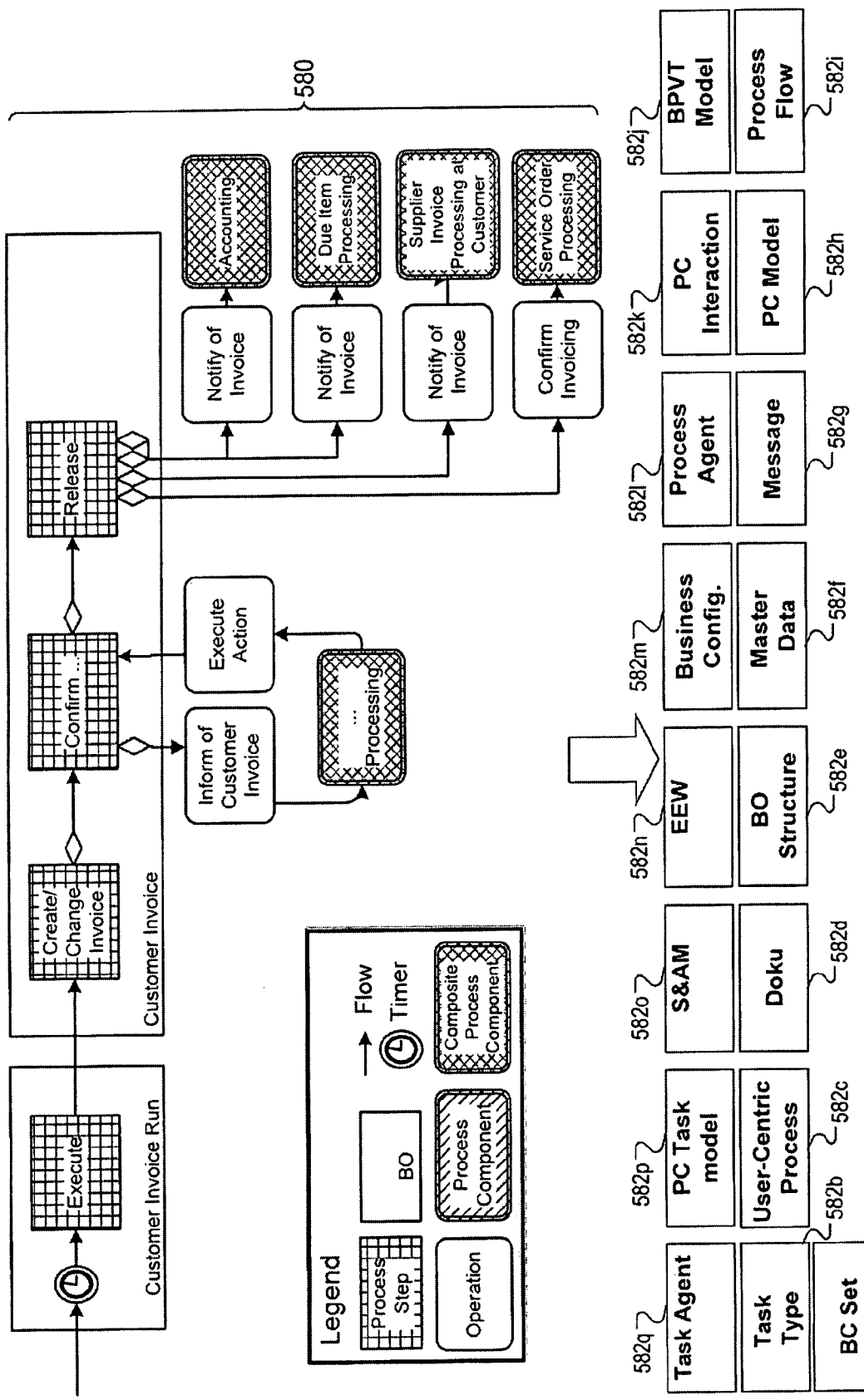

For business configuration extension, a third system may be extended by the wizard 502, such as a Business Design Time Repository. Overall, entities can be created in different development environments. For example, modeling tools such as ARIS for status and action management, ESR, backend via proxies, and so forth can be used. Coding can be created by the wizard 502 as appropriate. Accordingly, Business Process Variant models 526a-g are created or extended from the process flow model 560 as shown in FIG. 5B. Particularly, wizard 502 may facilitate automatic generation of underlying models in ESR, backend, and configuration at design time such as, for example, automatic coding creation in backend (in proxies or via rules). It may also work provide navigation possibilities from process flow model 580 to underlying executable models 582 as illustrated in FIG. 5C. In some cases, the flow model itself may not be changed, unless via patterns.

Figure 6A:
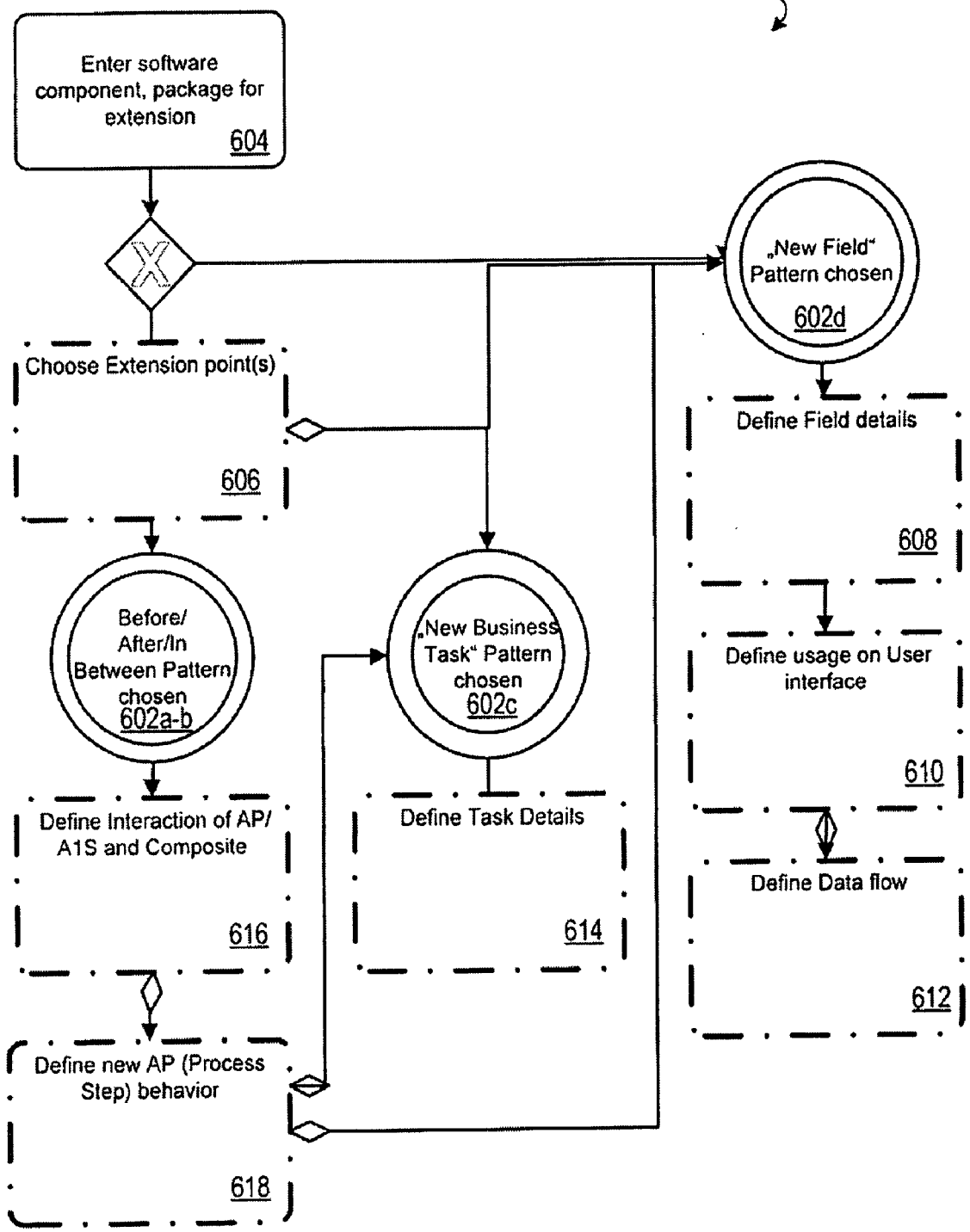
FIGS. 6A-B illustrate example flow diagrams of client interaction via the extensibility wizard.
Figures 1, 6B:
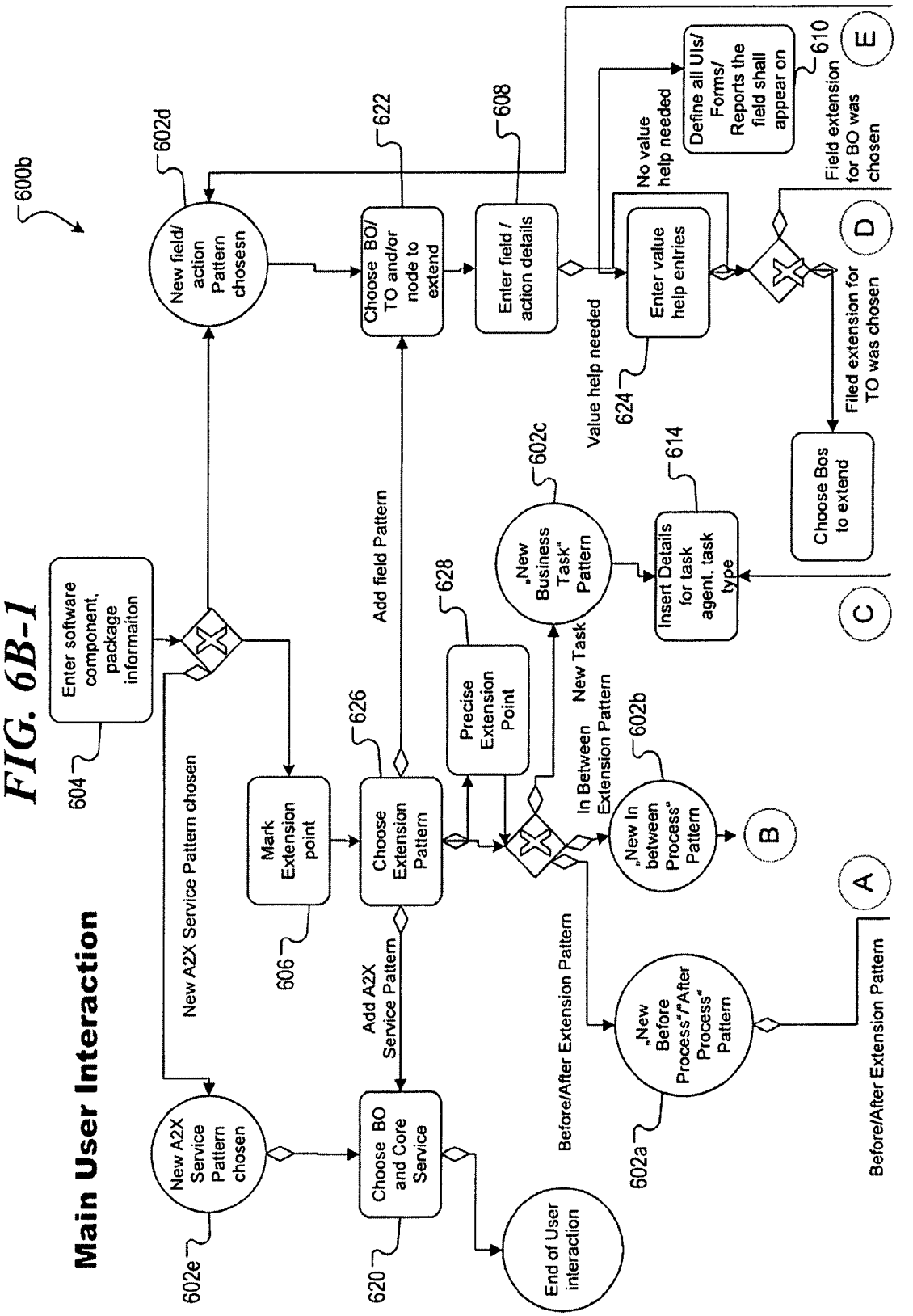
FIG. 1 illustrates an example system for managing multi-dimensional business process models in accordance with one embodiment of the present disclosure.
Figures 2, 6B:
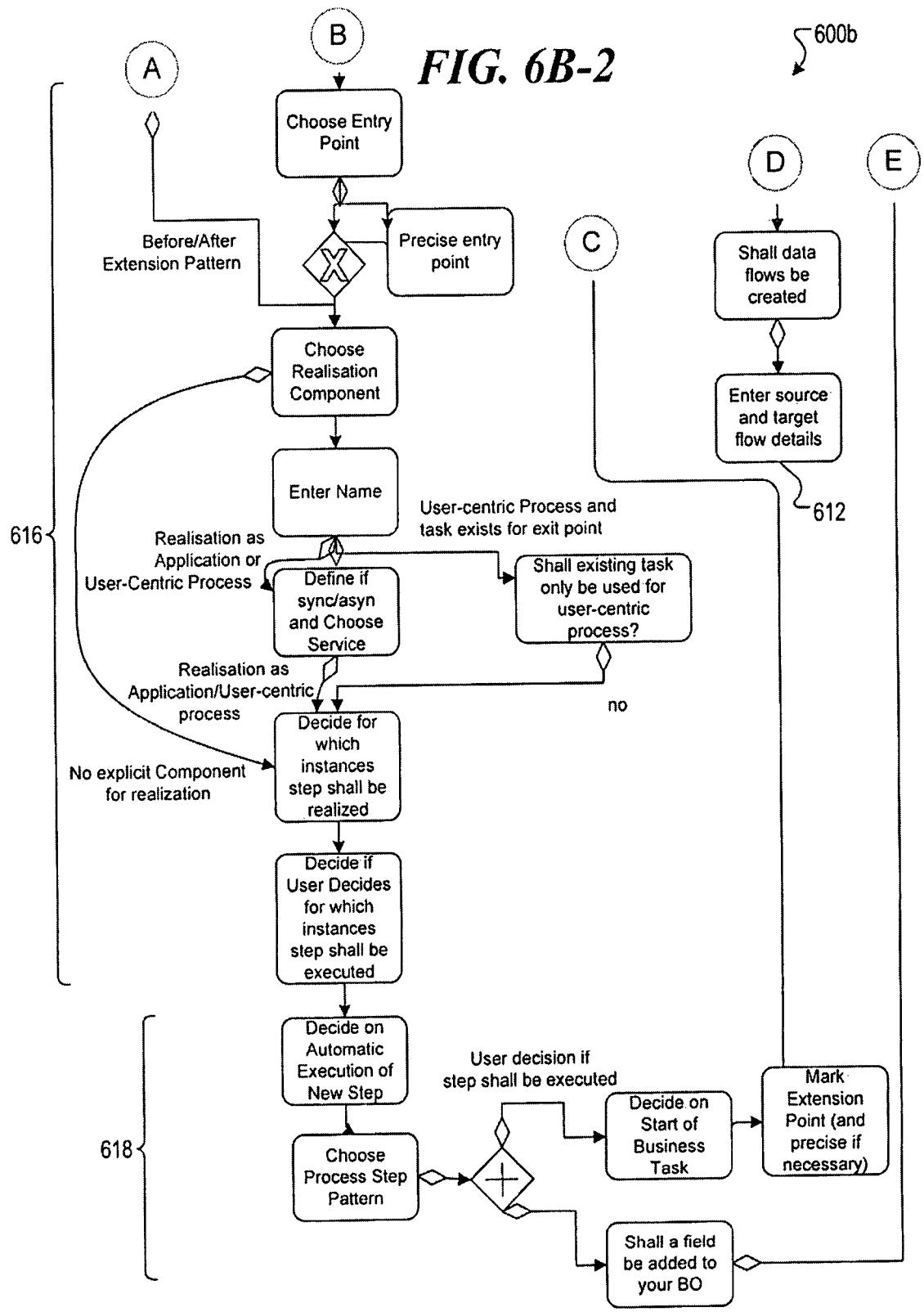

FIGS. 6A-B illustrate example flow diagrams of client interaction via the extensibility wizard. Particularly, FIG. 6A illustrates the extension process 600a for before process pattern extension and after process pattern extension 602a as well as in between process pattern extension 602b, business task pattern extension 602c, and add field pattern extension 602d. Process 600a begins with receiving (604) a user selection of a process component or package for extension. For example, wizard 502 may receive a process component selection from a user such as customer invoice processing process component and presents a flow model associated with the selected process component.

Process 600a either receives (606) an extension point user selection or an add field pattern extension 602d user selection. For example, wizard 502 may indicate to the user possible extension points for extension of the flow model. The user may select the extension point 504 in the flow model or the user may select the add field extension 530.

Process 600a receives a pattern extension user selection 602a-d if the process 600a has not already received the add field 602d selection. For example, wizard 502 may receive a user selection indicating extension pattern 518, 520, 526, 522, or 530.

If add field extension 602d is selected, then process 600a receives (608) a definition of field details from the user. For example, wizard 502 may receive a field name, type, and mandatory or optional indication from the user. Process 600a receives (610) a definition of the field on a user interface. For example, wizard 502 may receive information defining on which user interfaces, reports, and/or forms the field appears. Process 600a receives (612) a definition of a data flow for the field.

If add business task 602c is selected, then process 600a receives (614) a definition of task details from the user. For example, wizard 502 may receive a name, type, and/or trigger for the new task. The wizard automatically creates task type and task agent with conditions in backend (as described above).

If add before, after, or in between process extension 602a-b is selected, then process 600a receives (616) a definition of an interaction between an application platform and the composite process component. For example, wizard 502 may receive information defining an interaction between a customer invoice process component and an application platform for a country tax system, such as the Golden Tax in China. Process 600a receives (618) a new application platform or process step behavior. For example, wizard 502 may receive answers from a user indicating whether a new process component is called asynchronously or synchronously, sequential or parallel, if a process step is added, and automatically triggered or manually triggered. In each case, the S&AM scheme is normally extended. If a process component is used, then (in some instances) a process component interaction model is created, the process component model is extended, a BPVT model is extended, and a new BPVT model is created in ESR modeling environment. In the case of an automatic trigger, coding can be generated by the wizard 502 in backend.

FIG. 6B illustrates another example of an extension process 600b. Process 600b includes the steps shown in FIG. 6A and additional steps. Process 600b includes an additional pattern extension 602e for adding a business service. After the process 600b receives a selection of the pattern extension 602e, the process 600b prompts (620) the user to input a selection of a business object and core business service for the new business service. If the process 600b receives a selection of the add field extension 602d prompts (622) the user to select a business object, type object, or node to extend with the new field. Process 600b also prompts (624) the user to input possible values for the added field for a help feature.

If after prompting (606) the user to select an extension point, process 600b receives an extension point selection, then process 600b prompts (626) the user to select a pattern extension. Process 600b may prompt (628) the user to provide a specific extension point depending on the selected pattern extension and the elements within the process step that includes the previously selected extension point. Process 600b may request (616) information regarding the interaction and details of the added process, such as an entry point, a precise entry point, a realization component, a name for the added process, whether the added process is synchronous or asynchronous, whether the task is used for user-centric processes, which instances of the step will realize the extension, and whether a user may choose the realization of the extension execution. Process 600b may request (618) that the user provide behavior information regarding the added process, such as whether the step is automatically executed, a pattern for the process step, and any additional business tasks or fields added with the process step.

Figure 7A:
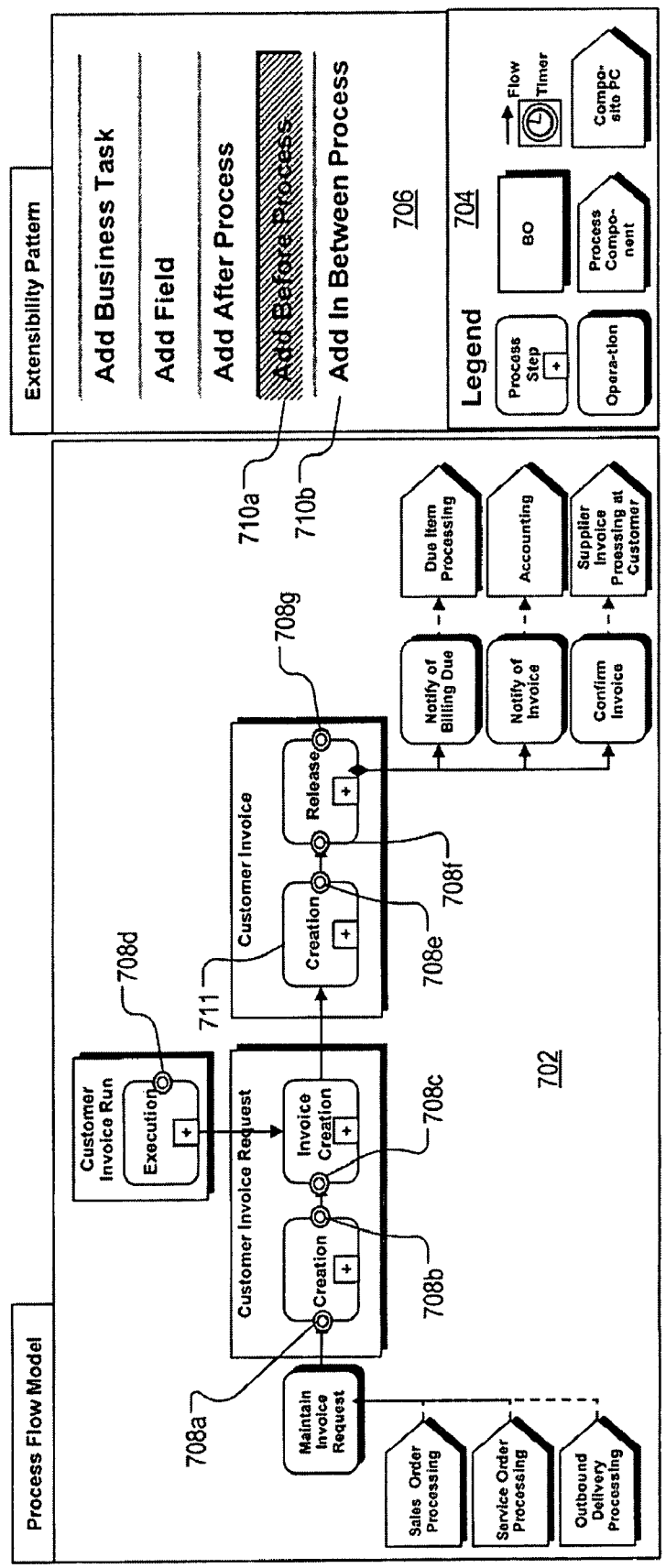
FIGS. 7A-C illustrate example interfaces presenting at least a portion of one multi-dimensional business process model and the extensibility wizard.
Figure 7B:
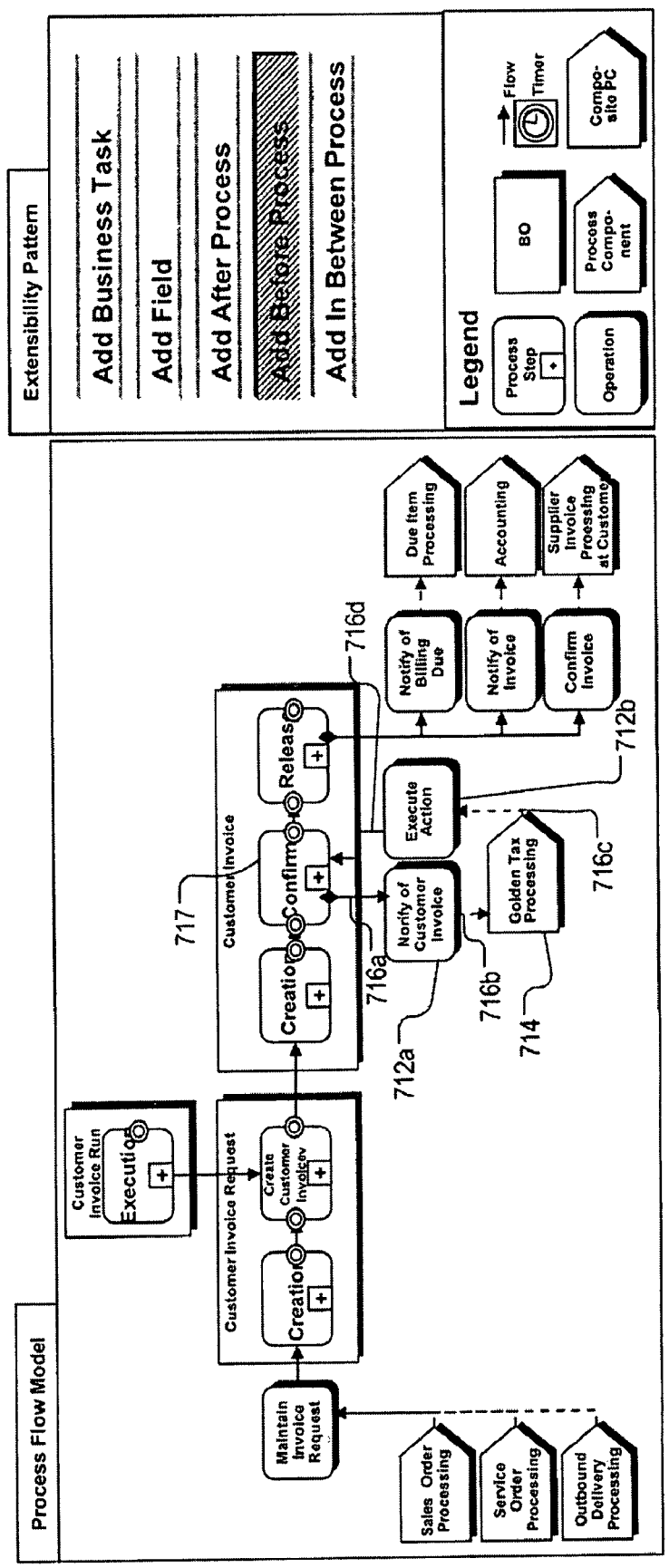
Figure 7C:
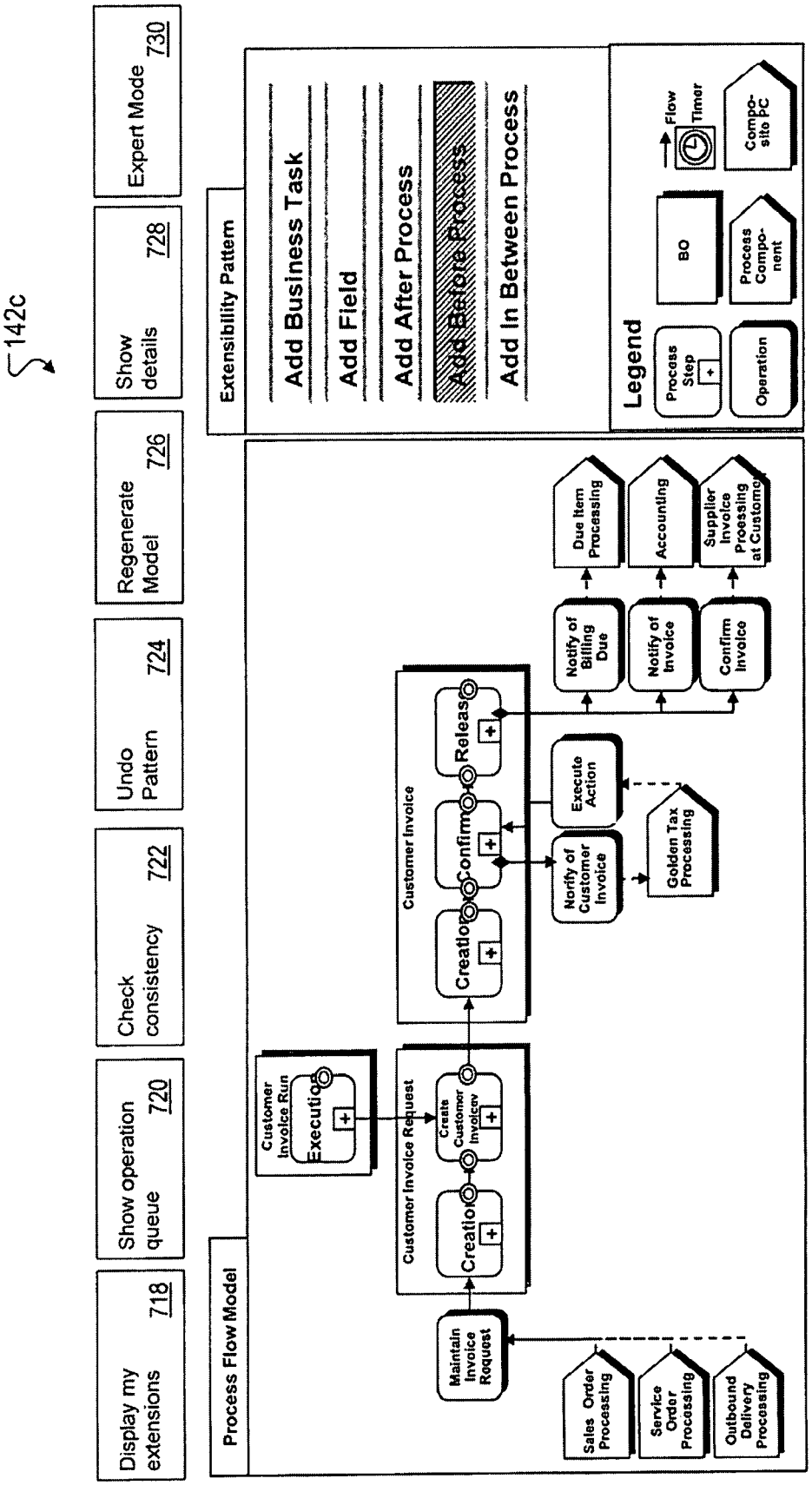

FIGS. 7A-C illustrate example interfaces 142a-c presenting at least a portion of one multi-dimensional business process model and the extensibility wizard 118. Referring to FIG. 7A, extensibility wizard 118 generates the interface 142a. Interface 142a presents a process flow model 702 for a customer invoice processing process component. Interface 142 also presents a legend 704 and available pattern extensions 706. The legend 704 describes the elements shown in the flow model 702. Wizard 118 indicates possible points of extension 708a-g in the flow model 702. A user may select one of the extension points 708a-g, such as extension point 708e. Wizard 118 modifies the available pattern extensions 706 based on the selection of the extension point 708e. For example, selecting the exit extension point 708e may preclude the user from selecting an add before process extension control 710a. The user may choose to select, for example, an add in between process extension 710b. Wizard 118 may present additional interfaces that ask the user questions that clarify the creation of the in between process extension. For example, if creation process step 711 includes multiple elements, such as actions or statuses, wizard 118 may expand the process step 711 and prompt the user to select a specific extension point within the process step 711. Wizard 118 may also request names for operations or process components created as a result of the extension as well as types of interactions between the operations and other components.

The user may select the add in between extension 708e to create processing for a Golden Tax. In the Golden Tax scenario a customer invoice requires a unique identifier (ID) provided by a government authority. In some implementations, the ID is required to send an invoice. The Golden Tax is designed to prevent tax fraud and may be mandatory in certain countries like China. To comply with these rules, customer invoice processing is extended. Before the customer invoice can be released, another process is triggered to interact with an application that processes the Golden Tax ID and the communication with the government. After the ID is known, customer invoice processing is called again with the ID and the original process can continue. The wizard 502 helps ensure that standard process is used in other countries except China via a rule 532 indicating instances for which the new process step will be created.

Referring to FIG. 7B, extensibility wizard 118 presents interface 142b showing operations 712a-b, a process component 714, flow interactions 716a-d, and a process step 717 created as a result of the in between process extension. The confirm process step 171 invokes the notify operation 712a to notify the golden tax process component 714 when a customer invoice is created. The golden tax process component 714 handles communication with the government organization to retrieve the golden tax ID. The golden tax process component 714 invokes the execute operation 712b to pass the golden tax ID to the confirm process step 717. The execute operation 712b returns processing to the confirm process step 717 and customer invoicing resumes. AS a result of answers to questions and inputs made by the user, wizard 118 generates the flows 716a-d. For example, the flow 716a between the confirm process step 717 and the notify operation 712a is a configurable automatic flow (e.g., automatically flows to operation 712a for invoices to Brazil or China). Wizard 118 generates the manually triggered flows 716b-c. For example, the golden tax process component 714 may be performed using human interaction. Wizard 118 generates the automatic flow 716d from the execute operation 712b to the confirm process step 717.

Referring to FIG. 7C, the extensibility wizard 118 presents a menu of options in the interface 142c. By selecting a display my extensions control 718, a user may request that the interface 142c present extensions created by the user. A user may review outstanding incomplete extension elements by selecting a show operation queue control 720. A user may request that the wizard 118 check the consistency of the flow model by selecting a check consistency control 722. A user may undo a pattern extension by selecting an undo pattern control 724. By selecting regenerate model, a user may request that the wizard 118 incorporate changes made to the various layers of the model into the coherent multi-dimensional business process model. A user may review details (e.g., view business tasks or other elements not currently shown) of the flow model by selecting a show details control 728. A user may enter an expert mode, for example, to modify underlying data, structures, or models by selecting an expert mode control 730.

The preceding figures and accompanying description illustrate processes and implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently individually, or in combination. In addition, many of the steps in these processes may take place simultaneously and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer program product tangibly embodied on a non-transient computer readable medium for processing a coherent multi-dimensional business process model, the computer program product storing instructions operable when executed by a hardware processor to:
- identify the coherent multi-dimensional business process model based on identifying at least a portion of a first model for a first business process and identifying at least a portion of a second model for the first business process, the at least a portion of the first model for the first business process and the at least a portion of the second model for the first business process defining the coherent multi-dimensional business process model;
- parse the multi-dimensional business process model to identify at least one extension point, each of the at least one extension points operable to interface a disparate business process with the first business process, the at least one extension point identifying a non-invasive point of extension of the first business process; and
- present an extension wizard to a client for a particular one of the identified extension points, the extension wizard providing a user interface to guide the extension of the first business process based on the identified extension points and the disparate business process, wherein the extension wizard creates an underlying model in an extension layer showing an extended multi-dimensional business process model as an abstraction, the extended multi-dimensional business process model including at least one extension of the first business process.

2. The computer program product of claim 1, the first model comprising a business process variant flow model and the second model comprising a state action model.

3. The computer program product of claim 1, the identified multi-dimensional business process model protected from modification by the client.

4. The computer program product of claim 1, the extension wizard presenting one or more extensibility patterns compatible with the particular extension point.

5. The computer program product of claim 4, the extensibility patterns selected from the following:
- add a business task;
- add field;
- add after process;
- add before process; and
- add in between process.

6. The computer program product of claim 4, the extensibility wizard operable to present a series of questions to the client based on the first model.

7. The computer program product of claim 4 further operable to add one or more modeling elements at the particular extension point in response to client input, the modeling elements representing the disparate business process.

8. The computer program product of claim 7 further operable to regenerate the coherent multi-dimensional business process model in response to the added modeled elements.

9. The computer program product of claim 8, the computer program product operable to regenerate the coherent multi-dimensional business process model and further operable to:
- modify the first model to accommodate the added modeling elements; and
- regenerate the coherent multi-dimensional business process model in response to the first model being modified.

10. The computer program product of claim 9 further operable to present a portion of the modified first model to the client.

11. The computer program product of claim 8 further operable to execute a consistency verification process prior to the regeneration.

12. The computer program product of claim 7 further operable to receive a textual identifier of one of the modeling elements from the client.

13. The computer program product of claim 7, each modeling element selected from the following:
- a process step;
- an operation;
- an inbound process agent;
- an outbound process agent;
- a task agent;
- a task type;
- a user-centric component;
- a business object;
- a flow;
- a timer;
- a process component; and
- a composite process component.

14. The computer program product of claim 1, the extensibility point comprising an asynchronous process step operable to be replaced.

15. A computer implementable method for processing a coherent multi-dimensional business process model, the method performed by at least one hardware processor and comprising:
- identifying the coherent multi-dimensional business process model based on identifying at least a portion of a first model for a business process and identifying at least a portion of a second model for the business process, the at least a portion of the first model for the business process and the at least a portion of the second model for the business process defining the coherent multi-dimensional business process model;
- parsing the multi-dimensional business process model to identify at least one extension point, each extension point operable to interface a disparate business process with the business process, the at least one extension point identifying a non-invasive point of extension of the business process; and
- presenting an extension wizard to a client for a particular one of the identified extension points, the extension wizard presenting one or more extensibility patterns compatible with the particular extension point and providing a user interface to guide the extension of the business process based on the identified extension points and the disparate business process, wherein the extension wizard creates an underlying model in an extension layer showing an extended multi-dimensional business process model as an abstraction, the extended multi-dimensional business process model including at least one extension of the business process.

16. The method of claim 15, the first model comprising a business process variant flow model and the second model comprising a state action model.

17. The method of claim 15, the extensibility patterns selected from the following:
- add a business task;
- add field;
- add after process;
- add before process; and
- add in between process.

18. The method of claim 15, the extensibility wizard operable to present a series of questions to the client based on the first model.

19. The method of claim 15 further comprising adding one or more modeling elements at the particular extension point in response to client input, the modeling elements representing the disparate business process.

20. The method of claim 19 further comprising:
modifying the first model to accommodate the added modeling elements; and
regenerating the coherent multi-dimensional business process model in response to the first model being modified.

21. The method of claim 20 further comprising presenting a portion of the modified first model to the client.

22. The method of claim 20 further comprising executing a consistency verification process prior to the regeneration.

23. The method of claim 19 further comprising receiving a textual identifier of one of the modeling elements from the client.

24. The method of claim 19, each modeling element selected from the following:
- a process step;
- an operation;
- a business object;
- a flow;
- a timer;
- a process component; and
- a composite process component.

25. The method of claim 15, the extensibility point comprising an asynchronous process step operable to be replaced.

26. The method of claim 15 further comprising creating: i) entities in an enterprise services repository (ESR), ii) corresponding proxies in a backend, and iii) automatic coding and configuration content at design time.

27. The computer program product of claim 1 wherein the extension wizard provides a visualization of the multi-dimensional business process model including the first business process, the disparate business process, and each extension point available for the first and disparate business processes.

28. The method of claim 15 further comprising visualizing the multi-dimensional business process model and each extension point available for the business process and the disparate business process of the multi-dimensional business process model.

29. The computer program product of claim 1 wherein the extension wizard automatically determines possible extension points permitted for the first business process of the multi-dimensional business process model.

30. The method of claim 15 wherein the extension wizard automatically determines possible extension points permitted for the business process of the multi-dimensional business process model.

* * * * *